US006868931B2

(12) United States Patent
Morrell et al.

(10) Patent No.: US 6,868,931 B2
(45) Date of Patent: Mar. 22, 2005

(54) SPEED LIMITING FOR A BALANCING TRANSPORTER ACCOUNTING FOR VARIATIONS IN SYSTEM CAPABILITY

(75) Inventors: John B. Morrell, Bedford, NH (US); David W. Robinson, Manchester, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 6 days.

(21) Appl. No.: 10/669,879

(22) Filed: Sep. 23, 2003

(65) Prior Publication Data

US 2004/0118622 A1 Jun. 24, 2004

Related U.S. Application Data

(63) Continuation-in-part of application No. 10/460,970, filed on Jun. 13, 2003, which is a continuation-in-part of application No. 09/325,976, filed on Jun. 4, 1999, which is a continuation-in-part of application No. 08/479,901, filed on Jun. 7, 1995, now Pat. No. 5,975,225, which is a continuation-in-part of application No. 08/384,705, filed on Feb. 3, 1995, now Pat. No. 5,971,091, which is a continuation-in-part of application No. 08/250,693, filed on May 27, 1994, now Pat. No. 5,701,965.

(60) Provisional application No. 60/388,845, filed on Jun. 14, 2002, and provisional application No. 60/389,134, filed on Jun. 14, 2002.

(51) Int. Cl.[7] .............................................. B60K 19/00
(52) U.S. Cl. ............................ 180/170; 180/179; 701/1
(58) Field of Search .......................... 180/7.1, 21, 218, 180/65.1, 170, 179; 701/1

(56) References Cited

U.S. PATENT DOCUMENTS 584,127 A  6/1897 Draullette et al.
849,270 A  4/1907 Schafer et al.
2,742,973 A  4/1956 Johannesen (List continued on next page.)

FOREIGN PATENT DOCUMENTS

DE  2 048 593  5/1971
DE  31 28 112 A1  2/1983
DE  32 42 880 A1  6/1983

(List continued on next page.)

OTHER PUBLICATIONS

Kawaji, S., *Stabilization of Unicycle Using Spinning Motion*, Denki Gakkai Ronbushi, D, vol. 107, Issue 1, Japan (1987), pp. 21–28.

Schoonwinkel, A., *Design and Test of a Computer–Stabilized Unicycle*, Stanford University (1988), UMI Dissertation Services.

Vos, D., *Dynamics and Nonlinear Adaptive Control of an Autonomous Unicycle*, Massachusetts Institute of Technology, 1989.

(List continued on next page.)

*Primary Examiner*—Lesley D. Morris
*Assistant Examiner*—Matthew Luby
(74) *Attorney, Agent, or Firm*—Bromberg & Sunstein LLP

(57) ABSTRACT

A class of transporters for carrying an individual over ground having a surface that may be irregular. Various embodiments have a motorized drive, mounted to the ground-contacting module that causes operation of the transporter in an operating position that is unstable with respect to tipping when the motorized drive arrangement is not powered. Related methods are provided for determining the maximum operating speed of the transporter from measurement of battery parameters and transporter motor current and for limiting the speed of the transporter to maintain stability based on various sets of operationally imposed margins.

2 Claims, 15 Drawing Sheets

U.S. PATENT DOCUMENTS

| | | |
|---|---|---|
| 3,145,797 A | 8/1964 | Taylor |
| 3,260,324 A | 7/1966 | Suarez |
| 3,283,398 A | 11/1966 | Andren |
| 3,288,234 A | 11/1966 | Feliz |
| 3,348,518 A | 10/1967 | Forsyth et al. |
| 3,374,845 A | 3/1968 | Selwyn |
| 3,399,742 A | 9/1968 | Malick |
| 3,446,304 A | 5/1969 | Alimanestiano |
| 3,450,219 A | 6/1969 | Fleming |
| 3,515,401 A | 6/1970 | Gross |
| 3,580,344 A | 5/1971 | Floyd |
| 3,596,298 A | 8/1971 | Durst, Jr. |
| 3,860,264 A | 1/1975 | Douglas et al. |
| 3,872,945 A | 3/1975 | Hickman et al. |
| 3,952,822 A | 4/1976 | Udden et al. |
| 4,018,440 A | 4/1977 | Deutsch |
| 4,062,558 A | 12/1977 | Wasserman |
| 4,076,270 A | 2/1978 | Winchell |
| 4,088,199 A | 5/1978 | Trautwein |
| 4,094,372 A | 6/1978 | Notter |
| 4,109,741 A | 8/1978 | Gabriel |
| 4,111,445 A | 9/1978 | Haibeck |
| 4,151,892 A | 5/1979 | Francken |
| 4,222,449 A | 9/1980 | Feliz |
| 4,264,082 A | 4/1981 | Fouchey, Jr. |
| 4,266,627 A | 5/1981 | Lauber |
| 4,293,052 A | 10/1981 | Daswick et al. |
| 4,325,565 A | 4/1982 | Winchell |
| 4,354,569 A | 10/1982 | Eichholz |
| 4,363,493 A | 12/1982 | Veneklasen |
| 4,373,600 A | 2/1983 | Buschbom et al. |
| 4,375,840 A | 3/1983 | Campbell |
| 4,510,956 A | 4/1985 | King |
| 4,560,022 A | 12/1985 | Kassai |
| 4,566,707 A | 1/1986 | Nitzberg |
| 4,570,078 A | 2/1986 | Yashima et al. |
| 4,571,844 A | 2/1986 | Komasaku et al. |
| 4,624,469 A | 11/1986 | Bourne, Jr. |
| 4,657,272 A | 4/1987 | Davenport |
| 4,685,693 A | 8/1987 | Vadjunec |
| 4,709,772 A | 12/1987 | Brunet |
| 4,716,980 A | 1/1988 | Butler |
| 4,740,001 A | 4/1988 | Torleumke |
| 4,746,132 A | 5/1988 | Eagan |
| 4,770,410 A | 9/1988 | Brown |
| 4,786,069 A | 11/1988 | Tang |
| 4,790,400 A | 12/1988 | Sheeter |
| 4,790,548 A | 12/1988 | Decelles et al. |
| 4,794,999 A | 1/1989 | Hester |
| 4,798,255 A | 1/1989 | Wu |
| 4,802,542 A | 2/1989 | Houston et al. |
| 4,809,804 A | 3/1989 | Houston et al. |
| 4,834,200 A | 5/1989 | Kajita |
| 4,863,182 A | 9/1989 | Chern |
| 4,867,188 A | 9/1989 | Reid |
| 4,869,279 A | 9/1989 | Hedges |
| 4,874,055 A | 10/1989 | Beer |
| 4,890,853 A | 1/1990 | Olson |
| 4,919,225 A | 4/1990 | Sturges |
| 4,953,851 A | 9/1990 | Sherlock et al. |
| 4,984,754 A | 1/1991 | Yarrington |
| 4,985,947 A | 1/1991 | Ethridge |
| 4,998,596 A | 3/1991 | Miksitz |
| 5,002,295 A | 3/1991 | Lin |
| 5,011,171 A | 4/1991 | Cook |
| 5,052,237 A | 10/1991 | Reimann |
| 5,111,899 A | 5/1992 | Reimann |
| 5,158,493 A | 10/1992 | Morgrey |
| 5,161,820 A | 11/1992 | Vollmer |
| 5,168,947 A | 12/1992 | Rodenborn |
| 5,171,173 A | 12/1992 | Henderson et al. |
| 5,186,270 A | 2/1993 | West |
| 5,221,883 A | 6/1993 | Takenaka et al. |
| 5,241,875 A | 9/1993 | Kochanneck |
| 5,248,007 A | 9/1993 | Watkins et al. |
| 5,314,034 A | 5/1994 | Chittal |
| 5,350,033 A | 9/1994 | Kraft |
| 5,366,036 A | 11/1994 | Perry |
| 5,376,868 A | 12/1994 | Toyoda et al. |
| 5,419,624 A | 5/1995 | Adler et al. |
| 5,701,965 A | 12/1997 | Kamen et al. |
| 5,701,968 A | 12/1997 | Wright-Ott et al. |
| 5,775,452 A | 7/1998 | Patmont |
| 5,791,425 A | 8/1998 | Kamen et al. |
| 5,794,730 A | 8/1998 | Kamen |
| 5,971,091 A | 10/1999 | Kamen et al. |
| 5,973,463 A | 10/1999 | Okuda et al. |
| 5,975,225 A | 11/1999 | Kamen et al. |
| 5,986,221 A | 11/1999 | Stanley |
| 6,003,624 A | 12/1999 | Jorgensen et al. |
| 6,039,142 A | 3/2000 | Eckstein et al. |
| 6,050,357 A | 4/2000 | Staelin et al. |
| 6,059,062 A | 5/2000 | Staelin et al. |
| 6,125,957 A | 10/2000 | Kauffmann |
| 6,131,057 A | 10/2000 | Tamaki et al. |
| 6,223,104 B1 | 4/2001 | Kamen et al. |
| 6,225,977 B1 | 5/2001 | Li |
| 6,288,505 B1 | 9/2001 | Heinzmann et al. |
| 6,302,230 B1 | 10/2001 | Kamen et al. |
| 6,367,817 B1 * | 4/2002 | Kamen et al. ............ 180/218 |
| 6,415,879 B2 * | 7/2002 | Kamen et al. ............ 180/8.2 |
| 6,443,250 B1 * | 9/2002 | Kamen et al. ............ 180/7.1 |
| 6,543,564 B1 * | 4/2003 | Kamen et al. ......... 180/89.13 |
| 6,651,763 B1 * | 11/2003 | Kamen et al. ............ 180/171 |
| 6,651,766 B2 * | 11/2003 | Kamen et al. ............ 180/218 |
| 6,779,621 B2 * | 8/2004 | Kamen et al. ............ 180/218 |
| 2002/0063006 A1 | 5/2002 | Burl et al. |

FOREIGN PATENT DOCUMENTS

| | | |
|---|---|---|
| DE | 3411489 A1 | 10/1984 |
| DE | 44 04 594 A 1 | 8/1995 |
| DE | 196 25 498 C1 | 11/1997 |
| DE | 298 08 091 U1 | 10/1998 |
| DE | 298 08 096 U1 | 10/1998 |
| EP | 0 109 927 | 7/1984 |
| EP | 0 193 473 | 9/1986 |
| EP | 0 537 698 A1 | 4/1993 |
| EP | 0663 313 A1 | 7/1995 |
| EP | 0 958 978 A2 | 11/1999 |
| FR | 980 237 | 5/1951 |
| FR | 2 502 090 | 9/1982 |
| GB | 152664 | 2/1922 |
| GB | 1213930 | 11/1970 |
| GB | 2 139 576 A | 11/1984 |
| JP | 52-44933 | 10/1975 |
| JP | 57-87766 | 6/1982 |
| JP | 57-110569 | 7/1982 |
| JP | 59-73372 | 4/1984 |
| JP | 62-12810 | 7/1985 |
| JP | 0255580 | 12/1985 |
| JP | 61-31685 | 2/1986 |
| JP | 63-305082 | 12/1988 |
| JP | 2-190277 | 7/1990 |
| JP | 4-201793 | 7/1992 |
| JP | 6-171562 | 12/1992 |
| JP | 5-213240 | 8/1993 |
| JP | 6-105415 | 12/1994 |
| JP | 7255780 | 3/1995 |
| WO | WO 86/05752 | 10/1986 |
| WO | WO 89/06117 | 7/1989 |
| WO | WO 96/23478 | 8/1996 |

| WO | WO 98/46474 | 10/1998 |
| --- | --- | --- |
| WO | WO 00 75001 A | 12/2000 |

OTHER PUBLICATIONS

Vos, D., *Nonlinear Control of an Autonomous Unicycle Robot: Practical Isues*, Massachusetts Institute of Technology, 1992.

Koyanagi et al., *A Wheeled Inverse Pendulum Type Self-Contained Mobile Robot and its Posture Control and Vehicle Control, The Society of Instrument and Control Engineers*, Special issue of the $31^{st}$ SICE Annual Conference, Japan 1992, pp. 13–16.

Koyanagi et al., *A Wheeled Inverse Pendulum Type Self-Contained Mobile Robot, The Society of Instrument and Control Engineers*, Special issue of the $31^{st}$ SICE Annual Conference, Japan 1992, pp. 51–56.

Koyanagi et al., *A Wheeled Inverse Pendulum Type Self-Contained Mobile Robot and its Two Dimensional Trajectory Control, Proceeding of the Second International Symposium on Measurement and Control in Robotics*, Japan 1992, pp. 891–898.

Watson Industries, Inc., Vertical Reference Manual ADS–C132–1A, 1992, pp. 3–4.

News article *Amazing Wheelchair Goes Up and Down Stairs*.

Osaka et al., *Stabilization of unicycle, Systems and Control*, vol. 25, No. 3, Japan 1981, pp. 159–166 (Abstract Only).

Roy et al., *Five–Wheel Unicycle System, Medical & Biological Engineering & Computing*, vol. 23, No. 6, United Kingdom 1985, pp. 593–596.

Kawaji, S., *Stabilization of Unicycle Using Spinning Motion, Denki Gakkai Ronbushi, D*, vol. 107, Issue 1, Japan 1987, pp. 21–28 (Abstract Only).

Schoonwinkel, A., *Design and Test of a Computer–Stabilized Unicycle, Dissertation Abstracts International*, vol. 49/03–B, Stanford University 1988, pp. 890–1294 (Abstract Only).

Vos et al. Dynamics and Nonlinear Adaptive Control of an Autonomous Unicycle—Theory and Experiment, *American Institute of Aeronautics and Astronautics*, A90–26772 10–39, Washington, D.C. 1990, pp. 487–494 (Abstract only).

TECKNICO'S Home Page, *Thos Amazing Flying Machines*, http://www.swiftsite.com/technico.

*Stew's Hovercraft Page*, http://www.stew/cam.com/hovercraft.html.

Kanoh, *Adaptive Control of Inverted Pendulum, Computrol*, vol. 2, (1983), pp. 69–75.

Yamafuji, *A Proposal for Modular–Structured Mobile Robots for Work that Principally Involve a Vehicle with Two Parallel Wheels, Automation Technology*, vol. 20, pp. 113–118 (1988).

Yamafuji & Kawamura, *Study of Postural and Driving Control of Coaxial Bicycle, Paper Read at Meeting of Japan Society of Mechanical Engineering* (Series C), vol. 54, No. 501, (May, 1988), pp. 1114–1121.

Yamafuji et al., *Synchronous Steering Control of a Parallel Bicycle, Paper Read at Meeting of Japan Society of Mechanical Engineering* (Series C), vol. 55, No. 513, (May, 1989), pp. 1229–1234.

Momoi & Yamafuji, *Motion Control of the Parallel Bicycle–Type Mobile Robot Composed of a Triple Inverted Pendulum, Paper Read at Meeting of Japan Society of Mechanical Engineering* (Series C), vol. 57, No. 541, (Sep., 1991), pp. 154–159.

\* cited by examiner

SPEED LIMITING FOR A BALANCING TRANSPORTER ACCOUNTING FOR VARIATIONS IN SYSTEM CAPABILITY The present application is a continuation-in-part application of copending application Ser. No. 10/460,970, filed Jun. 13, 2003, which is a continuation in part of U.S. application Ser. No. 09/325,976, filed Jun. 4, 1999, which is a continuation in part of U.S. application Ser. No. 08/479,901, filed Jun. 7, 1995, now issued as U.S. Pat. No. 5,975,225, which is a continuation in part of U.S. application Ser. No. 08/384,705, filed Feb. 3, 1995, now issued as U.S. Pat. No. 5,971,091, which is a continuation in part of U.S. application Ser. No. 08/250,693, filed May 27, 1994, now issued as U.S. Pat. No. 5,701,965. This application also claims priority from provisional application 60/388,845, filed Jun. 14, 2002. This application also claims priority from U.S. provisional patent application Ser. No. 60/389,134, filed Jun. 14, 2002. All of these applications are incorporated herein by reference.

TECHNICAL FIELD AND BACKGROUND ART

The present invention pertains to transporters and methods for transporting individuals, and more particularly to balancing transporters and methods for transporting individuals over ground having a surface that may be irregular.

A wide range of transporters and methods are known for transporting human subjects. Typically, such transporters rely upon static stability, being designed so as to be stable under all foreseen conditions of placement of their ground-contacting members. Thus, for example, the gravity vector acting on the center of gravity of an automobile passes between the points of ground contact of the automobile's wheels, the suspension keeping all wheels on the ground at all times, and the automobile is thus stable. Stable vehicles need not be precluded for reasons of stability from attaining their maximum operating speed.

Another type of transporter is a dynamically stabilized transporter, also known as a balancing transporter. Such transporters have a control system that actively maintains the stability of the transporter while the transporter is operating. The control system maintains the stability of the transporter by continuously sensing the orientation of the transporter, determining the corrective action to maintain stability, and commanding the wheel motors to make the corrective action. If the transporter loses the ability to maintain stability, such as through the failure of a component or a lack of sufficient power, the rider may experience a sudden loss of balance.

SUMMARY OF THE INVENTION

In accordance with preferred embodiments of the present invention, a method is provided for limiting the speed of a transporter having a motorized drive arrangement. The method has steps that include calculating a plurality of maximum speeds based on at least one of a margin of torque and a margin of motor speed specified to provide stable operation under specified sets of operating conditions, and then determining a speed limit locus in a plane of motor speed and motor torque such that the speed of the transporter exceeds no maximum speed determined in the first step. Finally, operation of the motorized drive arrangement is limited to preclude extended operation of the transporter at a speed exceeding the intervention locus.

In accordance with certain embodiments of the invention, the step of limiting operation may include shutting down the motorized drive arrangement if a specified torque margin may not be maintained.

In another embodiment of the invention, a method for limiting the speed of a transporter includes determining the instantaneous capability of the transporter, including the capability of the drive system and the energy storage device that powers the drive system. The speed of the transporter is then limited based at least in part on the instantaneous capability of the transporter as a whole, the drive system, and/or the storage device and the potential demands on the transporter based on its present operating condition.

In an embodiment of the present invention, a method is provided for estimating an instantaneous capability of one or more batteries. Each battery is characterized by an open circuit voltage and an internal resistance. The method includes measuring battery parameters including a voltage value and a current value; repeating measurements to obtain successive values of the battery parameters; and filtering the successive values of the battery parameters to estimate the instantaneous capability of the battery. The estimate of instantaneous capability for the battery may be used advantageously for limiting the speed of a transporter to maintain balance.

In a specific embodiment of the preceding embodiment, filtering the successive values of the battery parameters includes performing a statistical analysis of the successive values. In a further specific embodiment, filtering the successive values of the battery parameters includes performing recursive least squares regression. In yet another specific embodiment, filtering the measured battery parameters includes performing a recursive least squares regression with exponential forgetting.

In another embodiment of the invention, a method is provided for determining a maximum operating speed for a transporter. The transporter includes a battery supplying power to a motor, which propels the transporter. The method includes calculating an open circuit voltage estimate and an internal resistance estimate for the battery; and calculating the maximum operating speed as a function of the open circuit voltage estimate and the internal resistance estimate for the battery and the average motor current.

In a further embodiment of the invention, the transporter is a balancing transporter. The stability of the transporter in a fore-aft plane is maintained by applying a net torque about a ground contact region equal to a desired acceleration. A contribution to the net torque is provided that is a function of a system pitch value multiplied by a gain. The speed of the transporter may be limited by adding a pitch modification to the desired system pitch value. The pitch modification may be calculated based at least in part on the instantaneous capability of the drive system and the energy storage device that powers the drive system.

In specific embodiments of the invention, calculating a pitch modification may include: adding a proportional term contribution, where the proportional term contribution is a function of the difference between the system speed and an intervention speed; adding a derivative term contribution to the pitch modification, where the derivative term contribution is a function of a system acceleration; and adding an integral term contribution to the pitch modification, the integral term contribution formed by multiplying a gain by the difference between the system speed and a speed limit, and adding a previous integral term contribution.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
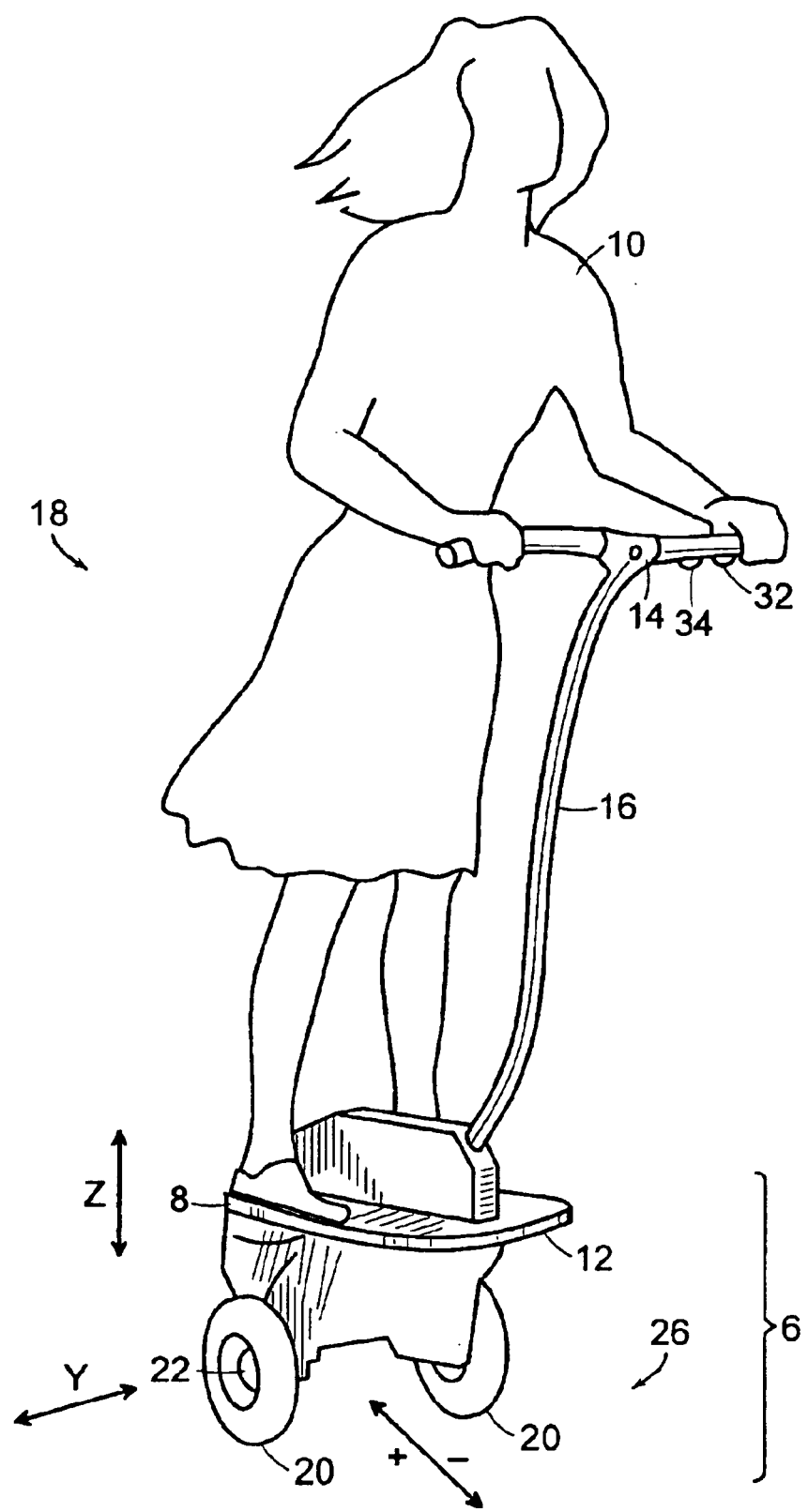
FIG. 1 is a side view of a personal transporter lacking a stable static position, in accordance with a preferred embodiment of the present invention, for supporting or conveying a subject who remains in a standing position thereon.

The subject matter of this application is related to U.S. Pat. Nos. 5,701,965; 5,971,091; 5,791,425; 6,302,230 and U.S. patent application Ser. No. 09/687,789, "Transporter Improvements," filed Oct. 13, 2000, which are all incorporated herein by reference in their entirety. The subject matter of this application is also related to the following U.S. provisional patent applications: "Gain Scheduling in Control of a Balancing Transporter," Ser. No. 60/388,723, and "Method and Device for Battery Charge Equalization,"; Ser. No. 60/388,986, each filed on Jun. 14, 2002, each of which is incorporated herein by reference in its entirety.

An alternative to operation of a statically stable transporter is that dynamic stability may be maintained by action of the user, as in the case of a bicycle or motorcycle or scooter, or, in accordance with embodiments of the present invention, by a control loop, as in the case of the human transporter described in U.S. Pat. No. 5,701,965. The invention may be implemented in a wide range of embodiments. A characteristic of many of these embodiments is the use of a pair of laterally disposed ground-contacting members to suspend the subject over the surface with respect to which the subject is being transported. The ground or other surface, such as a floor, over which a transporter in accordance with the invention is employed may be referred to generally herein as the "ground." The ground-contacting members are typically motor-driven. In many embodiments, the configuration in which the subject is suspended during locomotion lacks inherent stability at least a portion of the time with respect to a vertical in the fore-aft plane but is relatively stable with respect to a vertical in the lateral plane. Stability, as defined below, means that in response to a perturbation a stable device will tend towards its unperturbed state.

Some embodiments of the invention invoke the concept of primary wheels. The term "primary wheels," as used in this description and in any appended claims, refers to a minimum set of a transporter's wheels on which the transporter is capable of operating stably. More generally, the term "primary ground-contacting members" allows for a more general class of members that includes but is not limited to wheels. Hence, as used in this description and in any appended claims, "primary ground-contacting members" refers to a minimum set of a transporter's ground-contacting members on which the transporter is capable of operating stably. Other ground-contacting members may include, without limitation: arcuate sections of a wheel, clusters of wheels, treads, etc.

In various embodiments of the invention, fore-aft stability may be achieved by providing a control loop, in which one or more motors are included, for operation of a motorized drive in connection with the ground-contacting members. As described below, a pair of ground-contacting members may, for example, be a pair of wheels or a pair of wheel clusters. In the case of wheel clusters, each cluster may include a plurality of wheels. Each ground-contacting member, however, may instead be a plurality (typically a pair) of axially-adjacent, radially supported and rotatably mounted arcuate elements. In these embodiments, the ground-contacting members are driven by the motorized drive in the control loop in such a way as to maintain, when the transporter is not in locomotion, the center of mass of the transporter above the region of contact of the ground-contacting members with the ground, regardless of disturbances and forces operative on the transporter.

A ground-contacting member typically has a "point" (actually, a region) of contact or tangency with the surface over which the transporter is traveling or standing. Due to the compliance of the ground-contacting member, the "point" of contact is actually an area, where the region of contact may also be referred to as a contact patch. The weight of the transporter is distributed over the contact region, giving rise to a distribution of pressures over the region, with the center of pressure displaced forward during forward motion. The distribution of pressures is a function both of the composition and structure of the wheel, the rotational velocity of the wheel, the torque applied to the wheel, and thus of the frictional forces acting on the wheel.

Figure 8:
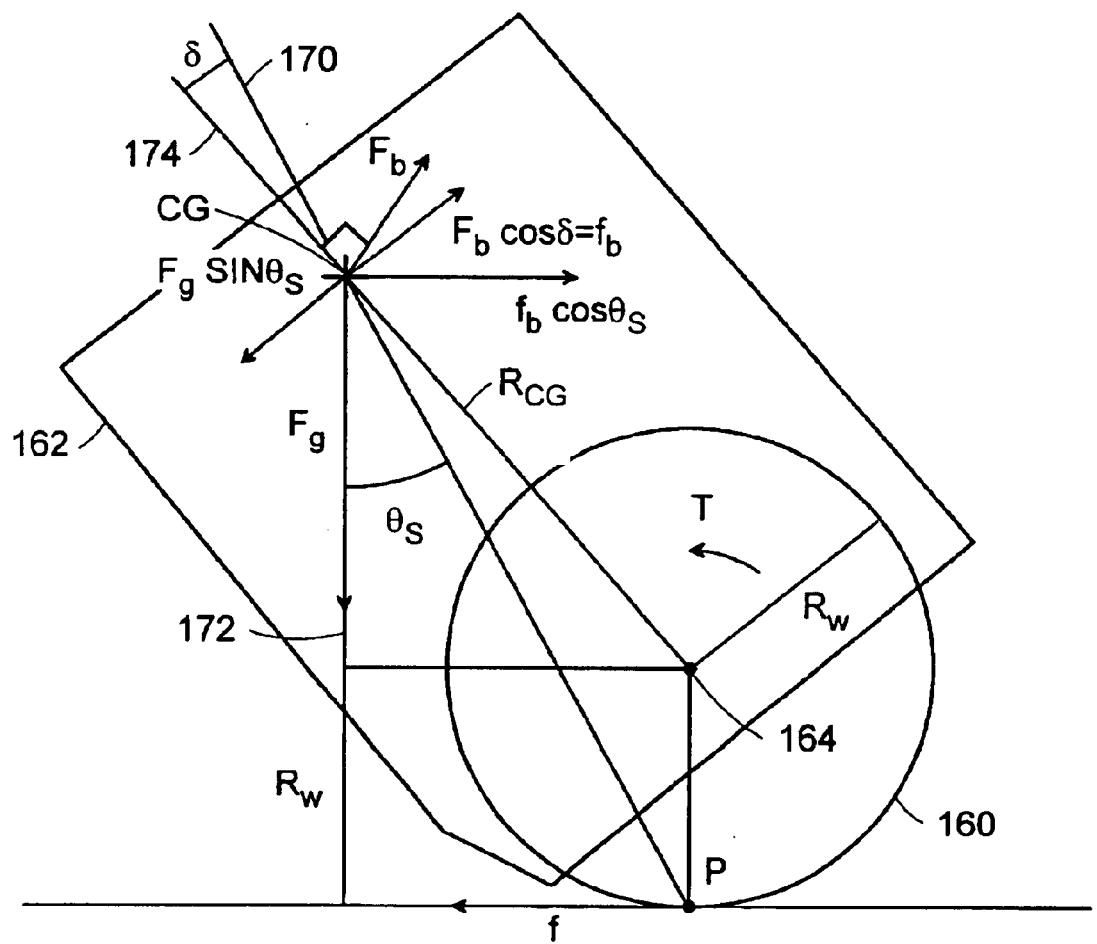
FIG. 8 shows an illustrative diagram of an idealized balancing transporter with a rigid wheel in motion at a constant velocity across a flat surface.

A force in the direction of motion is required to overcome rolling friction (and other frictional forces, including air resistance). Gravity may be used, in accordance with preferred embodiments of the invention, to provide a torque about the point of contact with the surface in a direction having a component in the sense of desired motion. Referring to FIG. 8, to illustrate these principles, a diagram is shown of the forces acting on a transporter that locomotes with constant velocity v on a single wheel over a flat surface. The principles now discussed may readily be generalized to operation on a sloped surface and to accommodate any other external forces that might be present. Wheel 160 of radius $R_w$ rotates with respect to chassis 162 about axle 164 and contacts the underlying surface at point P. For purposes of illustration only, it is assumed that wheel 160 contacts the surface at a point.

The wheel is driven with respect to the transporter by a torque T (supplied by a motor, for example) which in turn creates a reaction torque −T on the transporter. Since the torque acts about the axle 164, the reaction torque corresponds to a force $F_b$ acting at the center of gravity (CG) of the system, including the transporter and payload, where $F_b = T/R_{CG}$, where $R_{CG}$ is the distance between the axle and the CG of the system. The line 170 from the CG to point P is at an angle $\theta_s$ relative to the vertical 172.

The rolling friction, f, acting on the wheel at point P, is proportional to the velocity v of the rim of the wheel, with the proportionality expressed as $f = \mu v$. For constant velocity to be maintained, this force f must be exactly canceled. Consequently, with gravity providing the force, the condition that must be satisfied is:

$$F_b \cos \theta_s = f_b, \quad \text{(Eqn. 1)}$$

where $f_b$ is the component of the reaction force acting transverse to axis 174 between the CG and point P. In order to prevent the transporter from falling, a stability condition must also exist, namely that no net force acts on the CG in a direction transverse to line 170, i.e., there is no net torque about the point of contact P during motion at constant velocity (i.e., in an inertial frame of reference where the point P is fixed). This condition may be expressed as:

$$F_g \sin \theta_s = f_b, \quad \text{(Eqn. 2)}$$

where $F_g \sin \theta_s$ is the "tipping" component of gravity, and $f_b$ is the counter-tipping component of the reactive force on the transporter caused by wheel rotation ($f_b = F_b \cos \theta$), and where $\theta$ is the angle shown line 170 and line 174.

Eqns. 1 and 2 may be combined to yield $F_g \sin \theta_s \cos \theta_s = f = \mu v$, thus, in the limit of small angles (where $\sin \theta$ is approximately $\theta$), $$\theta_s = (\mu/F_g)v, \quad \text{(Eqn. 3)}$$

showing that increasing velocity requires increased lean to overcome the effects of friction. Additionally, a control loop that imposes stability on the system will respond to an increased lean by increasing velocity of the system. While the preceding discussion assumed constant velocity, additional lean beyond that required to overcome the effects of friction will result in acceleration since an additional forward-directed force acts on the CG. Conversely, in order to achieve acceleration (or deceleration) of the transporter, additional leaning (forward or backward) must be provided in a manner discussed in further detail below.

FIG. 1 shows a simplified embodiment of the invention. A personal transporter is shown and designated generally by numeral 18. A subject 10 stands on a support platform 12 and holds a grip 14 on a handle 16 attached to the platform 12, so that the transporter 18 of this embodiment may be operated in a manner analogous to a scooter. A control loop may be provided so that leaning of the subject results in the application of torque to wheel 20 about axle 22 thereby causing an acceleration of the transporter. Transporter 18, however, is statically unstable, and, absent operation of the control loop to maintain dynamic stability, subject 10 will no longer be supported in a standing position and will fall from platform 12. Different numbers of wheels or other ground-contacting members may advantageously be used in various embodiments of the invention as particularly suited to varying applications. Thus, as described in greater detail below, the number of ground-contacting members may be any number equal to, or greater than, one. For many applications, the dimensions of platform 12, and indeed of the entire ground-contacting module, designated generally by numeral 6, are advantageously comparable to the dimensions of the footprint or shoulder width of user 10. Thus transporter 18 may advantageously be used as a mobile work platform or a recreational transporter such as a golf cart, or as a delivery transporter.

Transporter 18 may be operated in a station-keeping mode, wherein balance is maintained substantially at a specified position. Additionally, transporter 18, which may be referred to herein, without limitation, as a "transporter," may also maintain a fixed position and orientation when the user 10 is not on platform 12. This mode of operation, referred to as a "kickstand" mode, prevents runaway of the transporter and provides for the safety of the user and other persons. A force plate 8 or other sensor, disposed on platform 12, detects the presence of a user on the transporter.

Figure 2:
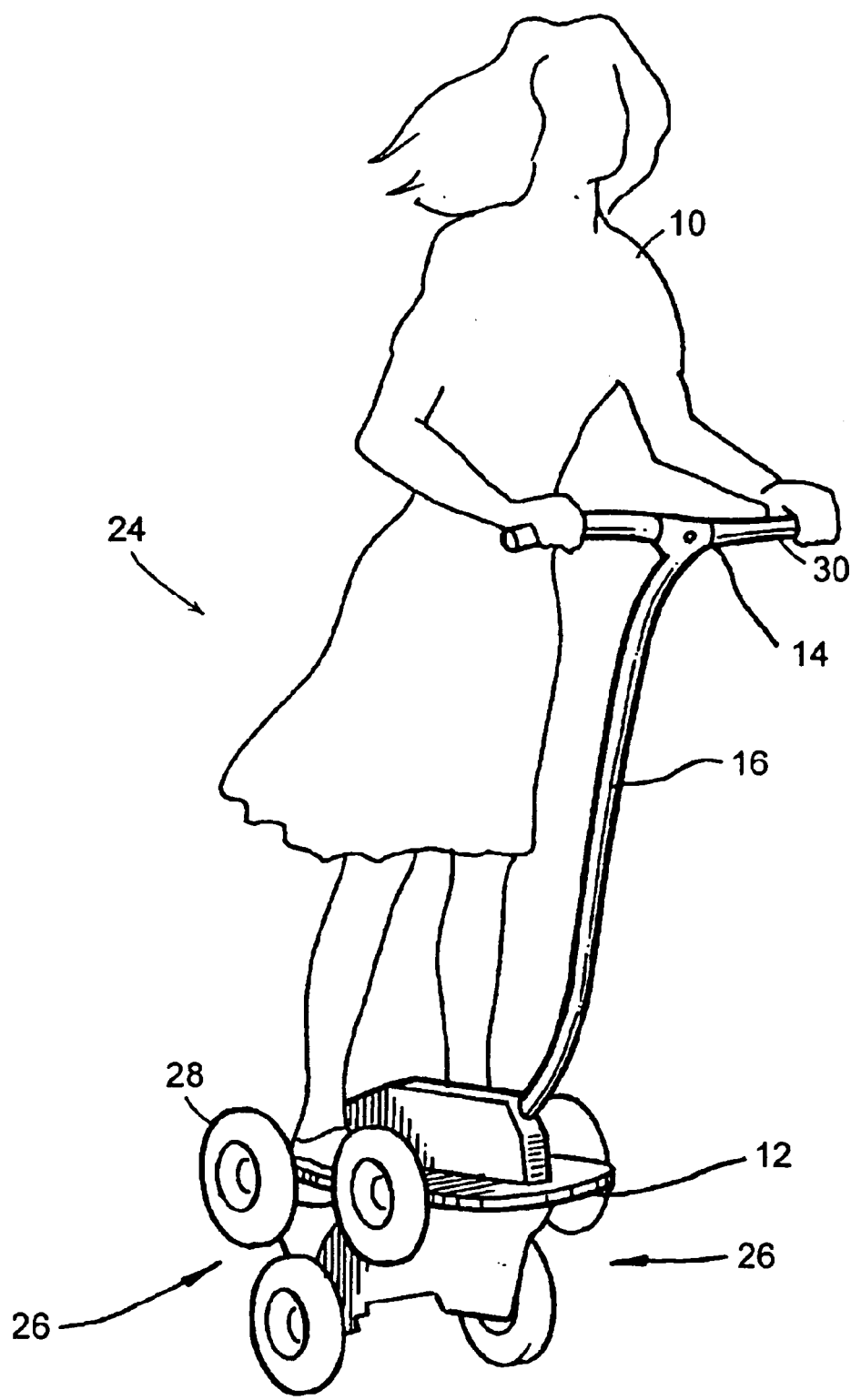
FIG. 2 is a perspective view of a further personal transporter lacking a stable static position, in accordance with an alternate embodiment of the present invention.

Another embodiment of a balancing transporter in accordance with the present invention is shown in FIG. 2 and designated generally by numeral 24. Personal transporter 24 shares the characteristics of transporter 18 of FIG. 1, namely a support platform 12 for supporting subject 10 and grip 14 on handle 16 attached to platform 12, so that the transporter 18 of this embodiment may also be operated in a manner analogous to a scooter. FIG. 2 shows that while transporter 24 may have clusters 26 each cluster having a plurality of wheels 28, transporter 24 remains statically unstable and, absent operation of a control loop to maintain dynamic stability, subject 10 will no longer be supported in a standing position and will fall from platform 12. In the embodiment of FIG. 2, as in the embodiment of FIG. 1, the primary ground-contacting members are a pair of wheels. Supplemental ground-contacting members may be used in stair climbing and descending or in traversing other obstacles. In one mode of operation, for example, it is possible to rotate clusters 26 so that two wheels on each of the clusters are simultaneously in contact with the ground. Stair climbing and flat-terrain locomotion may both be achieved, however, with the transporter supported on only a single set of primary ground-contacting members.

Operation of the balancing transporter will be described with reference to the set of coordinate axes shown in FIG. 1. Gravity defines the vertical axis z, while the axis coincident with the wheel axis 22 may be used to define a lateral axis y, and a fore-aft axis x is defined by the forward direction of motion of the transporter. The plane defined by the vertical axis z and the lateral axis y will sometimes be referred to as the "lateral plane", and the plane defined by the fore-aft axis x and the vertical axis z will sometimes be referred to as the "fore-aft plane". Directions parallel to the axes x and y are called the fore-aft and lateral directions respectively. It can be seen that the transporter, when relying on the pair of wheels 20 for contacting the ground, is inherently unstable with respect to a vertical in the fore-aft direction, but is relatively stable with respect to a vertical in the lateral direction. In other embodiments of the invention described below, the transporter may also be unstable with respect to yaw about the z axis.

The axes may also be defined with respect to platform 12 in cases such as where the ground-contacting member is a uniball.

Figure 3:
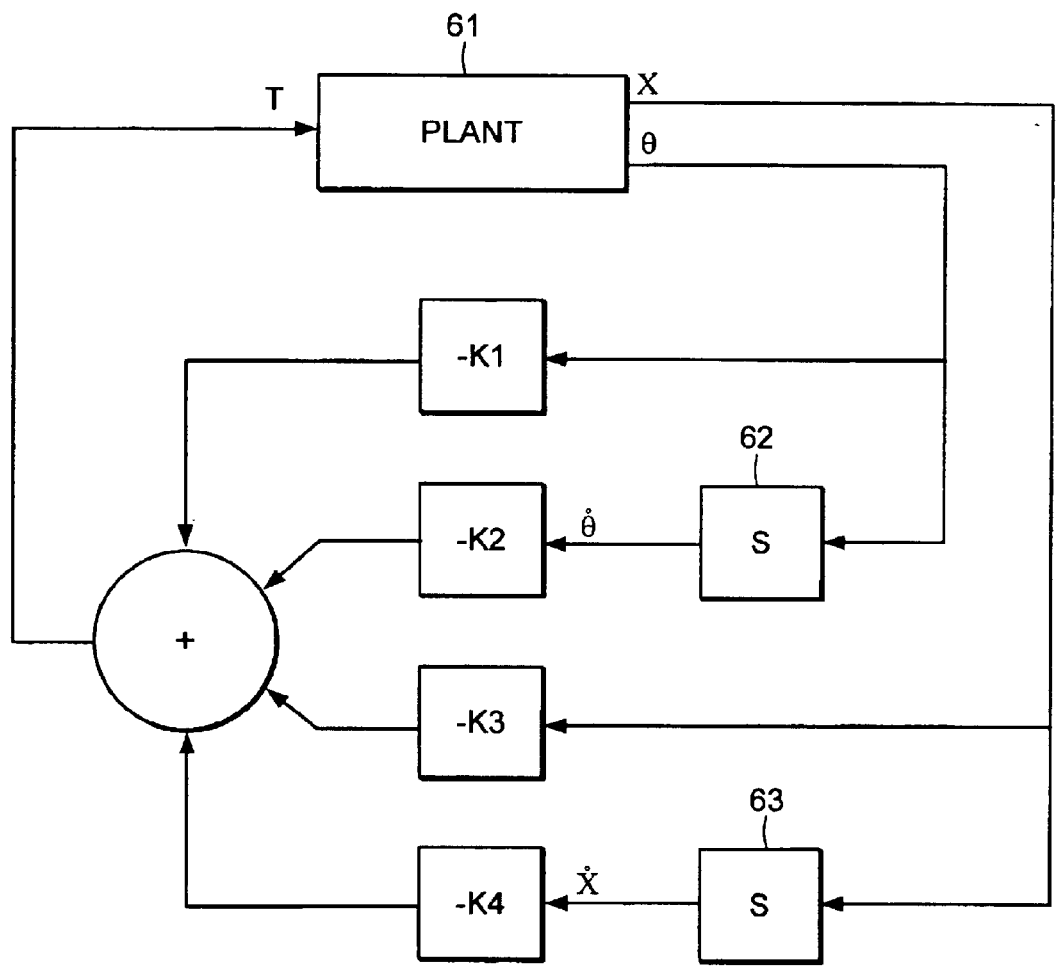
FIG. 3 illustrates the control strategy for a simplified version of FIG. 1 to achieve balance using wheel torque.

A simplified control algorithm for achieving balance in the embodiment of the invention according to FIG. 1 when the wheels are active for locomotion is shown in the block diagram of FIG. 3. The plant 61 is equivalent to the equations of motion of a system with a ground contacting module driven by a single motor, before the control loop is applied. T identifies the wheel torque. The remaining portion of the figure is the control used to achieve balance. The boxes 62 and 63 indicate differentiation. To achieve dynamic control to insure stability of the system, and to keep the system in the neighborhood of a reference point on the surface, the wheel torque T in this embodiment is governed by the following simplified control equation:

$$T = K_1(\theta - \theta_0) + K_2(\dot{\theta} - \dot{\theta}_0) + K_3(x - x_0) + K_4(\dot{x} - \dot{x}_0), \quad \text{(Eqn. 4)}$$

where:

T denotes a torque applied to a ground-contacting element about its axis of rotation;

$\theta$ is a quantity corresponding to the lean of the entire system about the ground contact, with $\theta_0$ representing the magnitude of a system pitch offset, all as discussed in detail below;

x identifies the fore-aft displacement along the surface relative to a fiducial reference point, with $x_0$ representing the magnitude of a specified fiducial reference offset;

a dot over a character denotes a variable differentiated with respect to time; and a subscripted variable denotes a specified offset that may be input into the system as described below; and $K_1$, $K_2$, $K_3$, and $K_4$ are gain coefficients that may be configured, either in design of the system or in real-time, on the basis of a current operating mode and operating conditions as well as preferences of a user. The gain coefficients may be of a positive, negative, or zero magnitude, affecting thereby the mode of operation of the transporter, as discussed below. The gains $K_1$, $K_2$, $K_3$, and $K_4$ are dependent upon the physical parameters of the system and other effects such as gravity. The simplified control algorithm of FIG. 3 maintains balance and also proximity to the reference point on the surface in the presence of disturbances such as changes to the system's center of mass with respect to the reference point on the surface due to body motion of the subject or contact with other persons or objects. It should be noted that the amplifier control may be configured to control motor current (in which case torque T is commanded, as shown in FIG. 3) or, alternatively, the voltage applied to the motor may be controlled, in which case the commanded parameter is velocity.

The effect of $\theta_0$ in the above control equation (Eqn. 4) is to produce a specified offset $-\theta_0$ from the non-pitched position where $\theta = 0$. Adjustment of $\theta_0$ will adjust the transporter's offset from a non-pitched position. As discussed in further detail below, in various embodiments, pitch offset may be adjusted by the user, for example, by means of a thumb wheel 32, shown in FIG. 1. An adjustable pitch offset is useful under a variety of circumstances. For example, when operating the transporter on an incline, it may be desirable for the operator to stand erect with respect to gravity when the transporter is stationary or moving at a uniform rate. On an upward incline, a forward torque on the wheels is required in order to keep the wheels in place. This requires that the user push the handle further forward, requiring that the user assume an awkward position. Conversely, on a downward incline, the handle must be drawn back in order to remain stationary. Under these circumstances, $\theta_0$ may advantageously be manually offset to allow control with respect to a stationary pitch comfortable to the user.

The size of $K_3$ will determine the extent to which the transporter will seek to return to a given location. With a non-zero $K_3$, the effect of $x_0$ is to produce a specified offset $-x_0$ from the fiducial reference by which x is measured. When $K_3$ is zero, the transporter has no bias to return to a given location. The consequence of this is that if the transporter is caused to lean in a forward direction, the transporter will move in a forward direction, thereby maintaining balance. Such a configuration is discussed further below.

The term "lean" is often used with respect to a system balanced on a single point of a perfectly rigid member. In that case, the point (or line) of contact between the member and the underlying surface has zero theoretical width. In that case, furthermore, lean may refer to a quantity that expresses the orientation with respect to the vertical (i.e., an imaginary line passing through the center of the earth) of a line from the center of gravity (CG) of the system through the theoretical line of ground contact of the wheel. While recognizing, as discussed above, that an actual ground-contacting member is not perfectly rigid, the term "lean" is used herein in the common sense of a theoretical limit of a rigid ground-contacting member. The term "system" refers to all mass caused to move due to motion of the ground-contacting elements with respect to the surface over which the transporter is moving.

"Stability" as used in this description and in any appended claims refers to the mechanical condition of an operating position with respect to which the system will naturally return if the system is perturbed away from the operating position in any respect.

In order to accommodate two wheels instead of the one-wheel system illustrated for simplicity in FIG. 3, separate motors may be provided for left and right wheels of the transporter and the torque desired from the left motor and the torque desired from the right motor can be calculated separately in the general manner described below in connection with FIG. 7. Additionally, tracking both the left wheel motion and the right wheel motion permits adjustments to be made to prevent unwanted turning of the transporter and to account for performance variations between the two drive motors.

Figure 4:
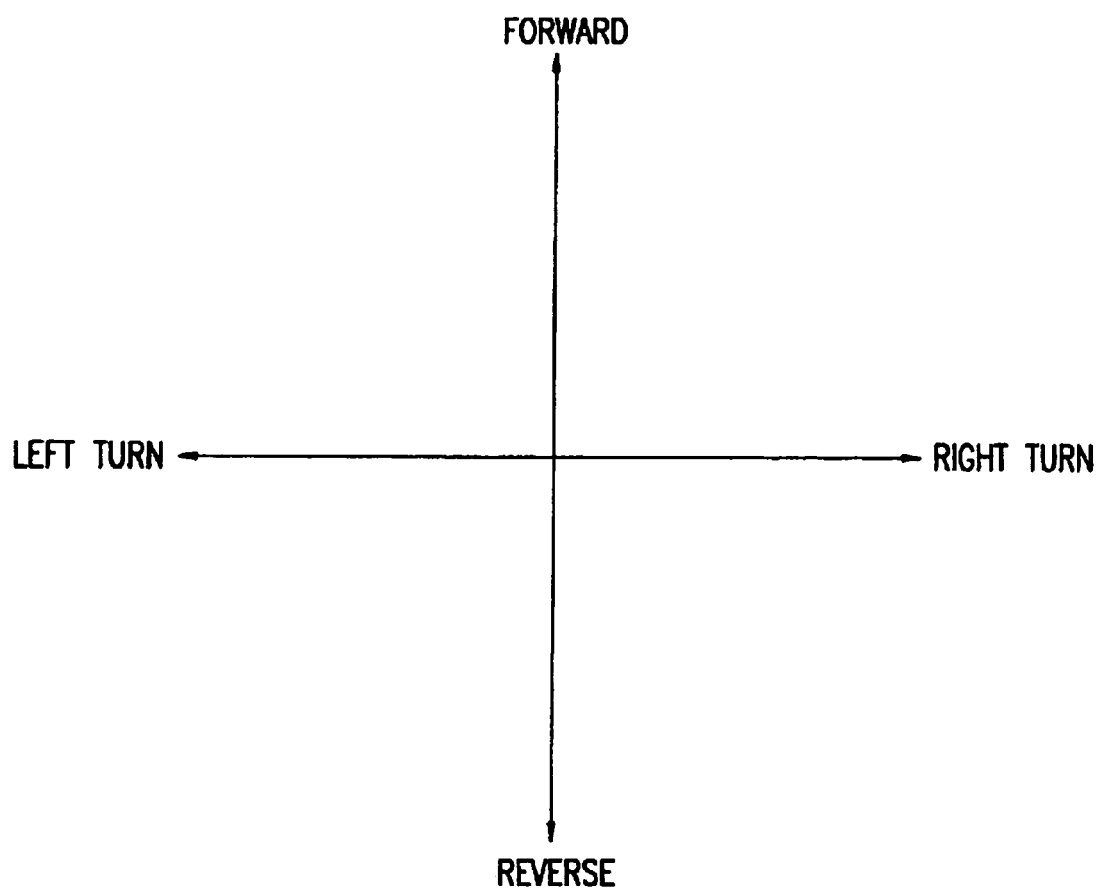
FIG. 4 illustrates diagrammatically the operation of joystick control of the wheels of the embodiment of FIG. 1.

In cases where gain $K_3$ is zero, a user control input such as a joystick may be used to adjust the torques of each motor. The joystick has axes indicated in FIG. 4. In operation of this embodiment, forward motion of the joystick is used to cause forward motion of the transporter, and reverse motion of the joystick causes backward motion of the transporter. A left turn similarly is accomplished by leftward motion of the joystick. For a right turn, the joystick is moved to the right. The configuration used here permits the transporter to turn in place when the joystick is moved to the left or to the right, by causing rotation of left and right motors, and hence left and right wheels, at equal rates in opposite senses of rotation. With respect to forward and reverse motion an alternative to the joystick is simply leaning forward or backward (in a case where $K_3$ is zero), since the pitch sensor (measuring $\theta$) would identify a pitch change that the system would respond to, leading to forward or reverse motion, depending on the direction of lean. In such instances, other types of yaw control (i.e., control to accomplish turning right or left can be used). Alternatively, control strategies based on fuzzy logic can be implemented.

It can be seen that the approach of adjusting motor torques when in the balance mode permits fore-aft stability to be achieved without the necessity of additional stabilizing wheels or struts (although such aids to stability may also be provided). In other words, stability is achieved dynamically, by motion of the components of the transporter (in this case constituting the entire transporter) relative to the ground.

Figure 5:
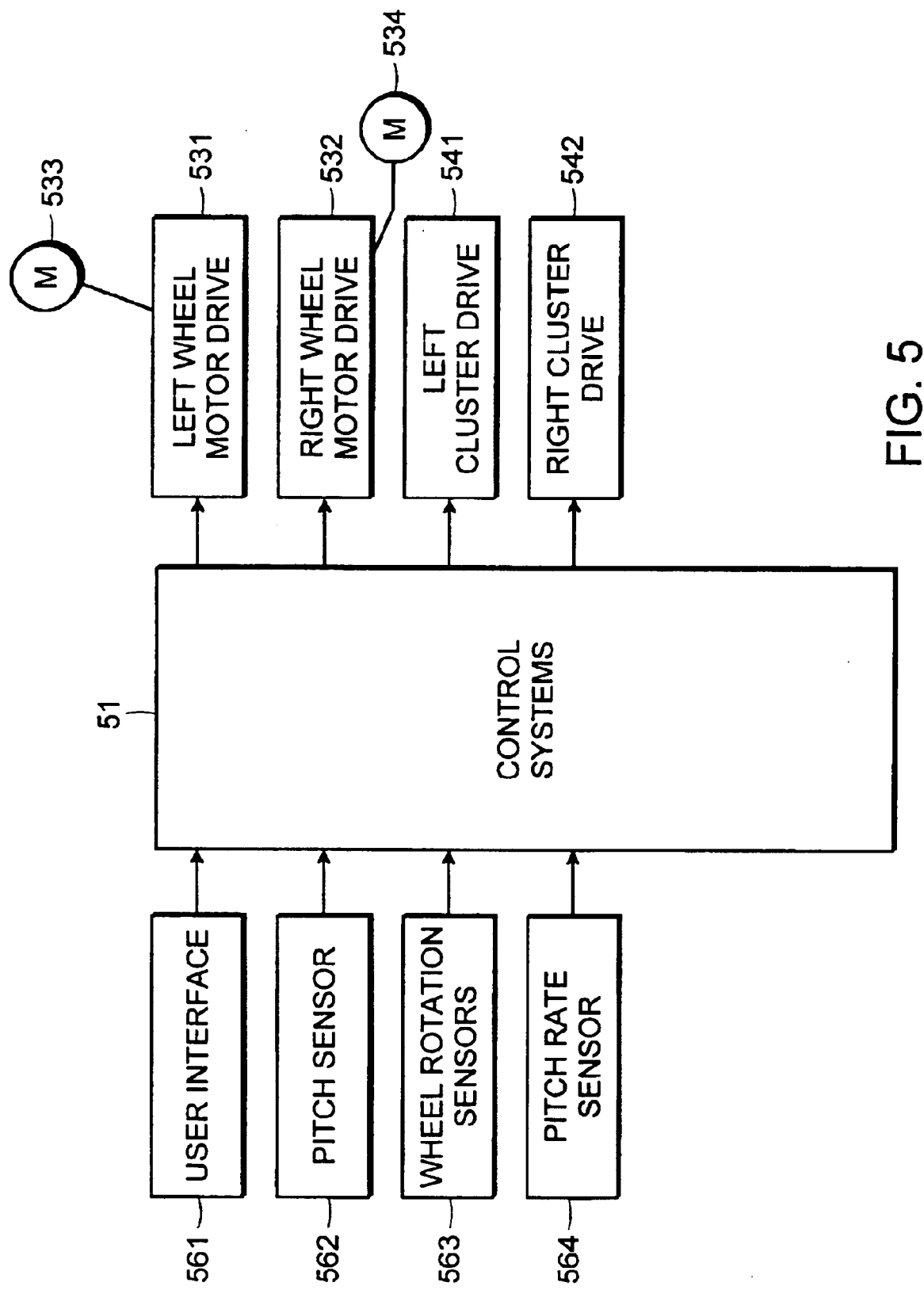
FIG. 5 is a block diagram showing generally the nature of sensors, power and control with the embodiment of FIG. 1.

In the block diagram of FIG. 5 it can be seen that a control system 51 is used to control the motor drives and actuators of the embodiment of FIGS. 1–3 to achieve locomotion and balance. These include motor drives 531 and 532 for left and right wheels respectively. If clusters are present as in the embodiment of FIG. 2, actuators 541 and 542 for left and right clusters respectively. The control system has data inputs including user interface 561, pitch sensor 562 for sensing fore-aft pitch, and wheel rotation sensors 563, and pitch rate sensor 564. Pitch rate and pitch may be derived through the use of gyroscopes or inclinometers, for example, alone or in combination. Control system 51 also may contain a balancing margin monitor which combines information on current battery parameters with information on motor parameters to calculate a maximum current speed of the transporter. The control system 51 may limit the speed of the transporter to ensure that adequate speed reserve is available to maintain balance. The control system 51 may further contain logic to reduce the speed of the transporter to avoid damaging the battery due to generation of over voltage. This condition can occur if the transporter is provided with capability to regenerate the battery during braking and when travelling downhill.

A grip 14 (shown in FIG. 1) may be conveniently provided with a thumb wheel 32 (shown in FIG. 1) or thumb-operated joystick for directional control, although other methods of control may also be used. Thumb wheel 32 may serve multiple control purposes as will now be described.

In accordance with other embodiments of the invention, handle 16 and grip 14 may be absent altogether, and the platform 12 may be equipped with sensors, such as force plate 8, for example, to detect leaning of the subject. Indeed, as described in connection with FIG. 5 and as further described below, the pitch of the transporter is sensed and may be used to govern operation of the control loop, so that if the subject leans forward, the transporter will move forward to maintain a desired velocity or to provide desired acceleration. Accordingly, a forward lean of the subject will cause the transporter to pitch forward and produce forward movement; a backward lean will cause the transporter to pitch backward and produce backward movement. Appropriate force transducers may be provided to sense leftward and rightward leaning and related controls provided to cause left and right turning as a result of the sensed leaning.

Leaning may also be detected using proximity sensors. Additionally, operation of the transporter may be governed on the basis of the orientation of the user with respect to the platform.

In a further embodiment, the transporter may be equipped with a foot- (or force-) actuated switch sensitive to the presence of a user on the transporter. Thus, for example, the transporter may be powered automatically upon ascent of a user onto the platform. Conversely, when the user alights from the transporter, power can be removed and the transporter disabled. Alternatively, the transporter may be programmed to enter a dynamic "kickstand" mode in which the transporter remains balanced in place when the user alights. Thus, the transporter is ready for the user to resume travel by reboarding the transporter. Furthermore, the transporter is thus safely parked while not actively operated by a user aboard the transporter.

Figure 6:
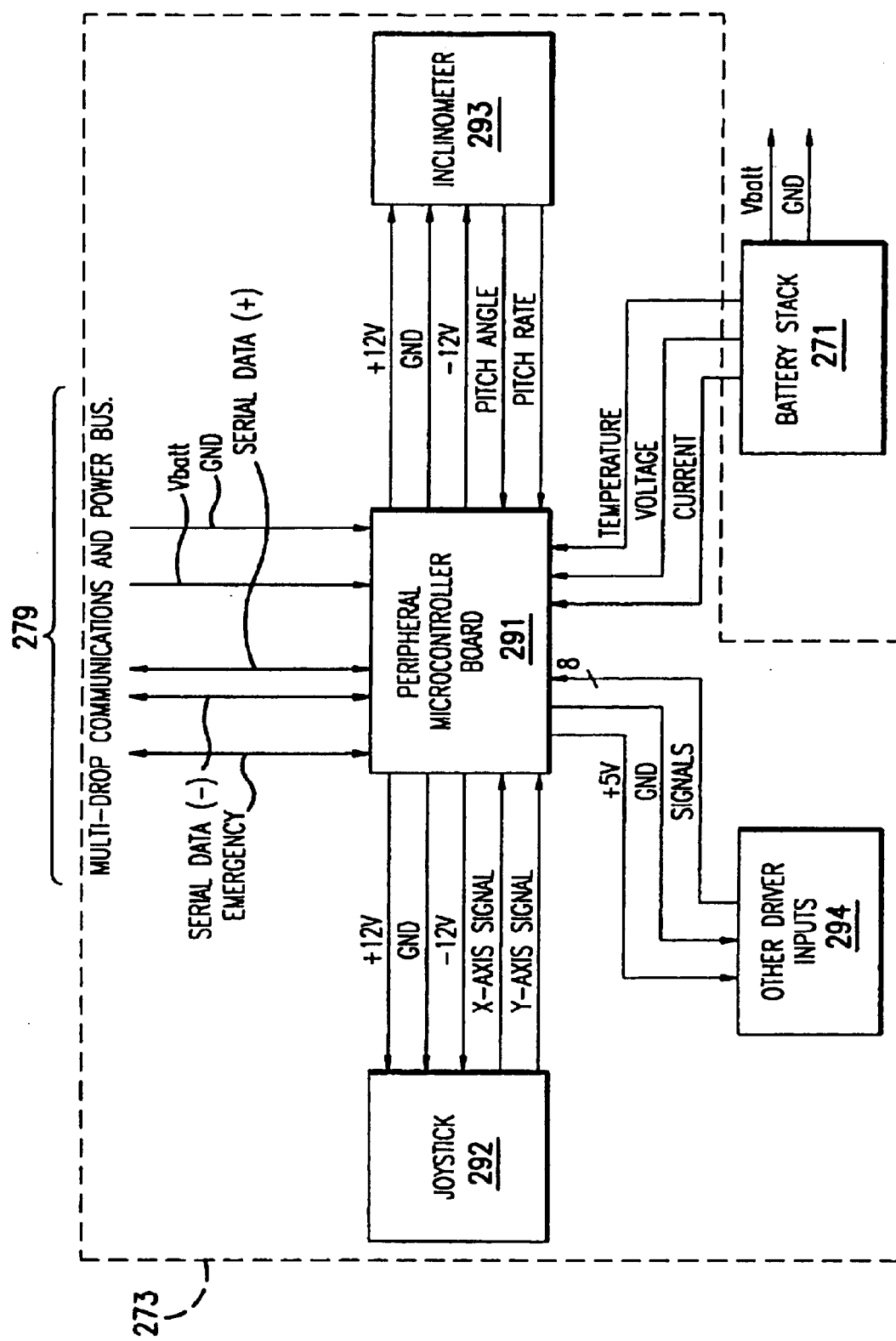
FIG. 6 is a block diagram providing detail of a driver interface assembly.

FIG. 6 is a block diagram providing detail of a driver interface assembly 273. A peripheral microcomputer board 291 receives an input from joystick 292 as well as from inclinometer 293 or another tilt-determining arrangement. The inclinometer provides information signals as to pitch and pitch rate. (The term "inclinometer" as used in this context throughout this description and in the accompanying claims means any device providing an output indicative of pitch or pitch rate, regardless of the arrangement used to achieve the output; if only one of the pitch and pitch rate variables is provided as an output, the other variable can be obtained by suitable differentiation or integration with respect to time.) To permit controlled banking into turns by the transporter (thereby to increase stability while turning) it is also feasible to utilize a second inclinometer to provide information as to roll and roll rate or, alternatively, the resultant of system weight and centrifugal force. Other inputs 294 may also be desirably provided as an input to the peripheral micro controller board 291. Such other inputs may include signals gated by switches (knobs and buttons) for platform adjustment and for determining the mode of operation. The peripheral micro controller board 291 also has inputs for receiving signals from the battery stack 271 as to battery voltage, battery current, and battery temperature. The peripheral micro controller board 291 is in communication over bus 279 with a central micro controller board that may be used to control the wheel motors as described below in connection with FIG. 7.

Figure 7:
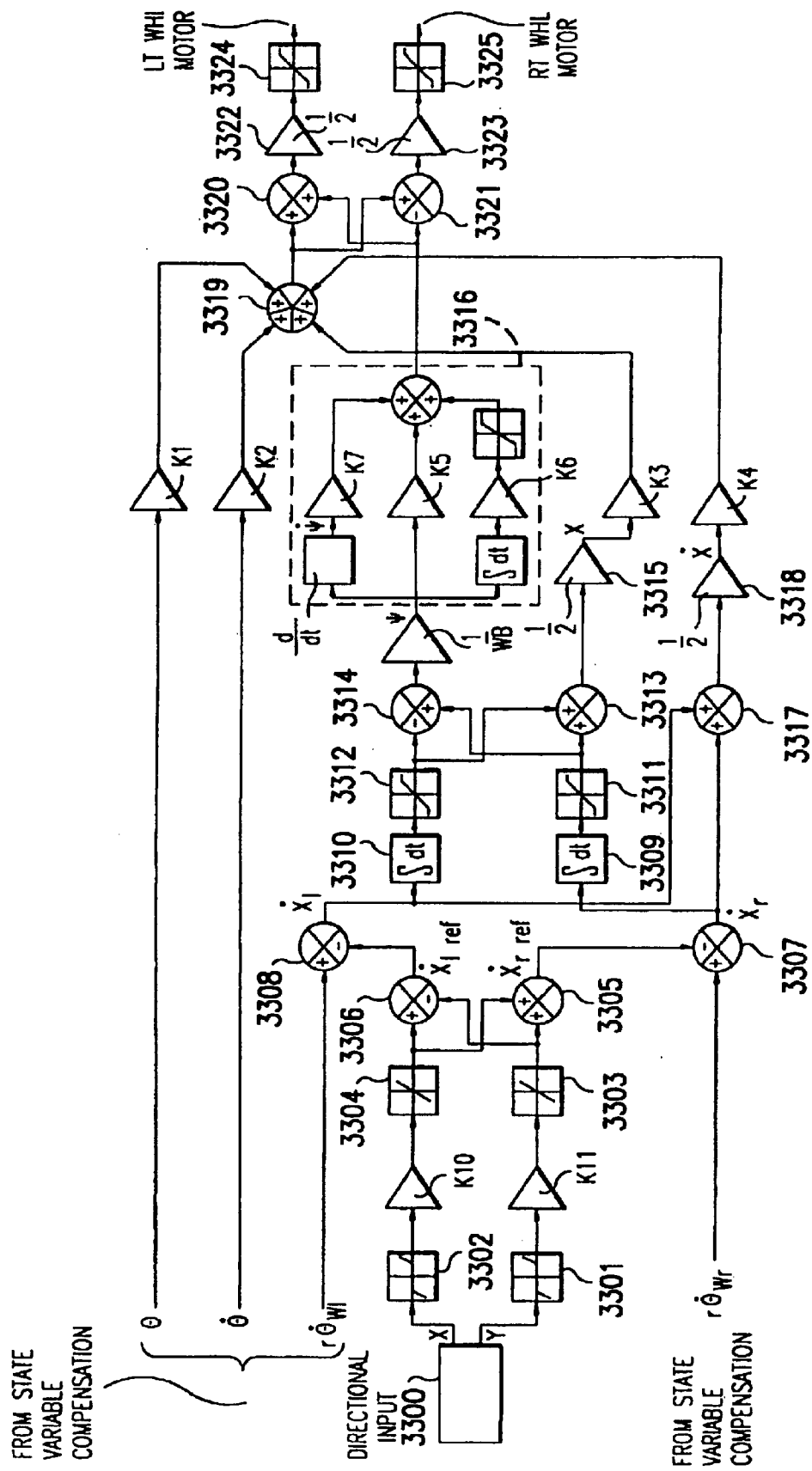
FIG. 7 is a schematic of the wheel motor control during balancing and normal locomotion, in accordance with an embodiment of the present invention.

FIG. 7 is a block diagram showing control algorithms, suitable for use in conjunction with the control assemblies of FIG. 6 to provide stability for a transporter according to the embodiment of FIGS. 1–2 and other embodiments in which the transporter and payload are balanced on two ground-contacting members, both during locomotion and in a fixed position. The following conventions are used in connection with the description below:

1. Variables defined in world coordinates are named using a single subscript in capital letters. World coordinates are coordinates fixed to the earth (inertial).
2. A non-subscripted r identifies a wheel radius.
3. Lower case subscripts are used to indicate other attributes, e.g., right/left, etc.: r=right; l=left; ref=reference; f=finish; s=start.
4. All angles are positive in the clockwise direction, where positive travel is in the positive x direction.
5. A dot over a variable indicates differentiation in time, e.g., $\dot{\theta}$.

FIG. 7 shows the control arrangement for the motors of the right and left wheels. The arrangement has inputs of $\theta$, $\dot{\theta}$, $r\dot{\theta}_{wl}$ (linear velocity of the left wheel relative to the world coordinate system) and $r\dot{\theta}_{wr}$ (linear velocity of the right wheel), in addition to directional inputs 3300 determined by joystick position along X and Y axes of a reference coordinate system. Inputs $\theta$, $\dot{\theta}$, and error signals x and $\dot{x}$ (described below), subject to gains $K_1$, $K_2$, $K_3$, and $K_4$ respectively, become inputs to summer 3319, which produces the basic balancing torque command for the wheels, in the general manner described above in connection with FIG. 3 above. The output of summer 3319 is combined with the output of yaw PID loop 3316 (described below) in summer 3320, then divided in divider 3322 and limited in saturation limiter 3324, to produce the left wheel torque command. Similarly, the output of summer 3319 is combined with the output of PID loop 3316 in summer 3321, then divided in divider 3323 and limited in saturation limiter 3325, to produce the right wheel torque command.

In FIG. 7, a directional input along the X axis moves the reference coordinate system along its X axis relative to the world coordinate system (which represents the traveled surface), at a velocity proportional to the displacement of the joystick. A directional input along the Y axis rotates the reference coordinate system about its Z axis at an angular velocity proportional to the displacement of the joystick. It will be appreciated that motion of the joystick in the positive X direction is here interpreted to mean forward motion; motion of the joystick in the negative X direction means reverse motion. Similarly, motion of the joystick in the positive Y direction means leftward turning, counter-clockwise as viewed from above; motion of the joystick in the negative Y direction means rightward turning clockwise as viewed from above. Hence the directional inputs Y and X are given deadband via deadband blocks 3301 and 3302 respectively, to widen the neutral position of the joystick, then subject to gains K11 and K10, then rate-limited by limiters 3303 and 3304 respectively, which limit the angular and linear accelerations respectively of the reference coordinate system. The sum of these outputs achieved through summer 3305 becomes the reference velocity $\dot{x}_{r\,ref}$ whereas the difference of these outputs achieved through summer 3306 becomes the reference velocity $\dot{x}_{l\,ref}$. These reference velocities are subtracted in summers 3308 and 3307 from compensated linear velocity input signals $r\dot{\theta}_{wl}$ and $r\dot{\theta}_{wr}$ for left and right wheels to obtain velocity error signals $\dot{x}_l$ and $\dot{x}_r$ for left and right wheels within the reference coordinate system. In turn the average of these signals, determined via summer 3317 and divider 3318, produces a linear velocity error signal. Displacement error signal x is derived by integrating $r\dot{\theta}_{wl}$ and $r\dot{\theta}_{wr}$ in integrators 3310 and 3309, limiting the results in saturation limiters 3312 and 3311, and then averaging their outputs via summer 3313 and divider 3315. The difference between these displacements, determined via summer 3314, produces the yaw error signal $\Psi$.

The yaw error signal $\Psi$ is run through a standard proportional-plus-integral-plus-derivative (PID) control loop 3316, the output of which is combined with the output of the basic balancing torque command of summer 3319, to produce the individual wheel torque commands, which cause the wheels to maintain fore-aft stability and also cause the transporter to align itself with the axes of, and follow the origin of, the reference coordinate system as directed by directional input 3300.

Let us now consider how this control causes the transporter to start. The directional input 3300 (which may be a joystick) which will provide a positive x for forward motion. The signal is divided and summed in summers 3308 and 3307, and subtracted from the right and left wheel velocity $\dot{x}_R$ and $\dot{x}_L$ providing a negative correction; this correction leads ultimately to a negative torque contribution at summer 3319, causing the wheels to move backward, so as to create a torque due to gravity that causes the transporter to lean forward. This forward lean leads to changing $\theta$ and $\dot{\theta}$, which leads to positive corrections in summer 3319, causing the transporter to move forward. Thus, moving the joystick forward or backward will cause the transporter to lean forward or backward, as the case may be, and to move in the direction of the lean. This is a property of the control of FIG. 7. An equivalent result can be achieved by leaning, where $K_3$ is zero.

Acceleration of the transporter may be established by system lean. For example, to achieve forward acceleration of the transporter by forward system lean; the center of gravity of the system (transporter and payload) would be placed forward of the center of the pressure distribution of the contact region where the wheels contact the ground—the more the lean, the more the acceleration. Thus, furthermore, it can be seen that leaning, in conjunction with gravity and friction, determines acceleration (positive or negative) of the system. In this manner, if the transporter is moving forward, pitching the system back will achieve braking. Because the transporter must overcome friction, there is typically some system lean when the transporter is moving at constant velocity over level ground. In other words, looking at the torque on the transporter caused by gravity and the torque caused by all other external forces, the torque applied by the motorized drive is adjusted so that the net torque from all these sources produces a desired acceleration.

Speed Limiting

Figure 9:
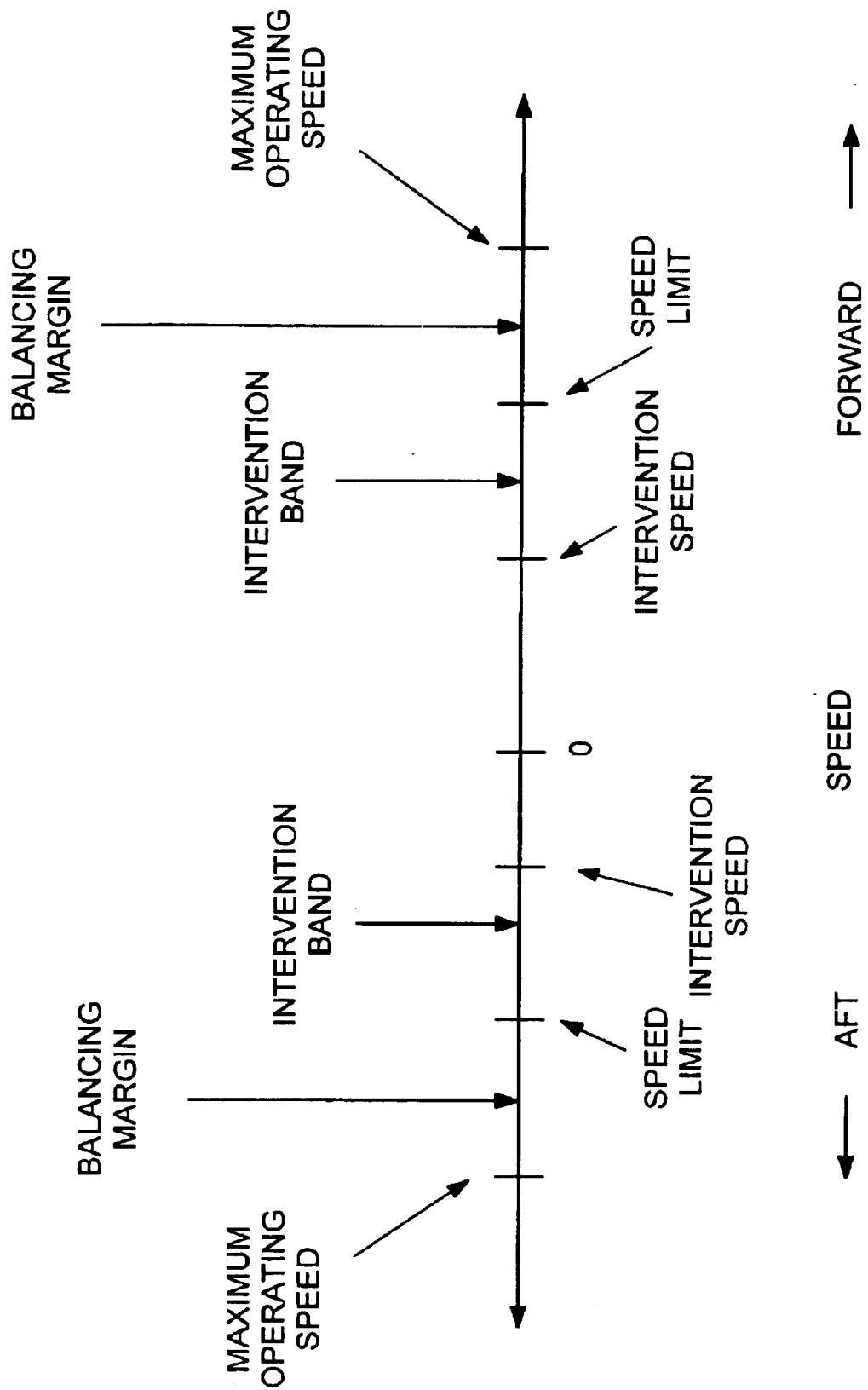
FIG. 9 illustrates the relationship among various speed limiting parameters for a typical balancing transporter.

In a further embodiment of the invention, any of the foregoing embodiments of a transporter in accordance with the present invention may be provided with speed limiting to maintain balance and control, which may otherwise be lost if the wheels (arcuate elements, or other ground-contacting members) were permitted to reach a maximum operating speed for the transporter. The term "maximum operating speed" as used in the specification and in any appended claims, unless context requires otherwise, will mean the maximum speed at which the transporter is presently capable of being propelled. This maximum operating speed will typically be a function of an instantaneous capability of the transporter, such as the capability of the drive system and/or the capability of the energy storage device provided to power drive system. For example, the energy storage device may be chemical (in which case it is referred to as a 'battery') or otherwise. The "instantaneous capability" of the energy storage device is a measure of the instantaneous power that can be delivered by the device and the "maximum capability" of the device is a measure of the greatest power that the device can supply at any time. The terms "speed intervention band," "intervention speed," and "speed limit" as used in the specification and in any appended claims, unless context requires otherwise, will mean a range or band of speeds extending from an "intervention speed" at the lower end to a "speed limit" at the upper end. The intervention speed is a threshold speed at which means may be employed to reduce the transporter's speed. A transporter will typically be operated with a margin between the maximum operating speed and the speed limit, as illustrated in FIG. 9. This margin helps ensure that the transporter will maintain balance over a range of operating conditions.

Speed reduction may be accomplished by pitching the transporter back in the direction opposite from the current direction of travel, which causes the transporter to slow down. (As discussed above, the extent and direction of system lean determine the transporter's acceleration.) In this embodiment, the transporter is pitched back by adding a pitch modification to the inclinometer pitch value. Speed reduction can occur whenever the transporter velocity of the transporter exceeds the intervention speed. The pitch modification is determined by looking at the difference between the transporter velocity and the intervention speed, integrated over time. The automatic pitch modification sequence may be maintained until the transporter slows to the desired dropout speed (some speed below the intervention speed), and the pitch angle may then be smoothly returned to its original value.

Maximum Operating Speed Estimation

One method for determining the maximum operating speed of the transporter, if the energy storage device is a battery, is to monitor the battery voltage and current produced, which are then used to estimate the maximum velocity the transporter is currently capable of maintaining.

Another method is to measure the voltages of the battery and the motor and to monitor the difference between the two;

the difference provides an estimate of the amount of velocity margin (or balancing margin) currently available to the transporter.

Figure 10:
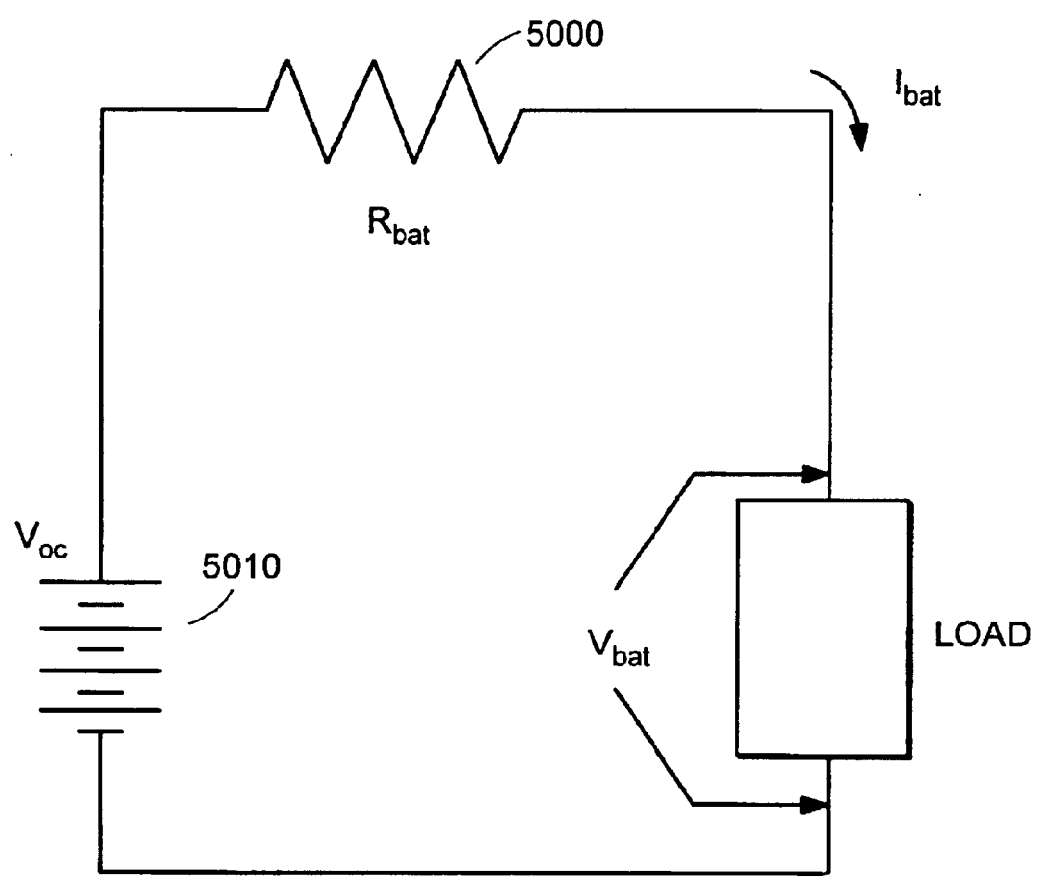
FIG. 10 is a circuit diagram of a battery in series with a load in accordance with an embodiment of the present invention.

In a further embodiment of the invention, a method for estimating the instantaneous capability of a battery is provided. As shown in FIG. 10, a simplified model 5000 is used for the battery, consisting of a "perfect" DC voltage source 5010 with "open circuit" voltage, $V_{oc}$, a series resistance for the battery, $R_{bat}$, a current, $I_{bat}$, and a battery voltage, $V_{bat}$. $V_{oc}$ and $R_{bat}$ cannot be measured but can be estimated from measurements of $V_{bat}$ and $I_{bat}$. Ideally, these variables should follow a linear relationship:

$$V_{bat} = V_{oc} - (I_{bat} * R_{bat}) \quad \text{(Eqn. 5)}.$$

Since this linear relationship is ideal, measured values of $V_{bat}$ and $I_{bat}$ will likely present a "scatter plot." Note that 'statistical' as used herein, in either adjectival or adverbial form, refers to the drawing of inferences as to the value of a parameter based on sampling the value by measurement at intervals that may be regular or irregular with respect to distribution of the samples in time or in terms of another dimension. The verb 'filter', as used herein and in any appended claims, refers to the process of extracting a value attributable to a single point in time from a plurality of data that may be obtained in successive samplings and may be subject to either random or systematic fluctuations, or both. Application of filtering techniques, as are known in the art, to the data allows estimated values of $V_{oc}$ and $R_{bat}$ to be derived. For example, a regression analysis using a least squares technique may be employed to derive estimated values of $V_{oc}$ and $R_{bat}$ from the measured values of $V_{bat}$ and $I_{bat}$. $V_{oc}$ and $R_{bat}$ will change, such as, for example, due to ambient temperature, battery temperature, battery age, battery usage (both the overall amount of usage and usage pattern), and over time as the battery charge is depleted (and regenerated). Accordingly, a more accurate estimate may be obtained if the more recent measured values of $V_{bat}$ and $I_{bat}$ are used for the regression or more recent values are weighted more heavily than older values.

In a specific embodiment of the present invention, a recursive least squares technique with exponential forgetting is employed to estimate $V_{oc}$ and $R_{bat}$ for the battery.

Figure 11:
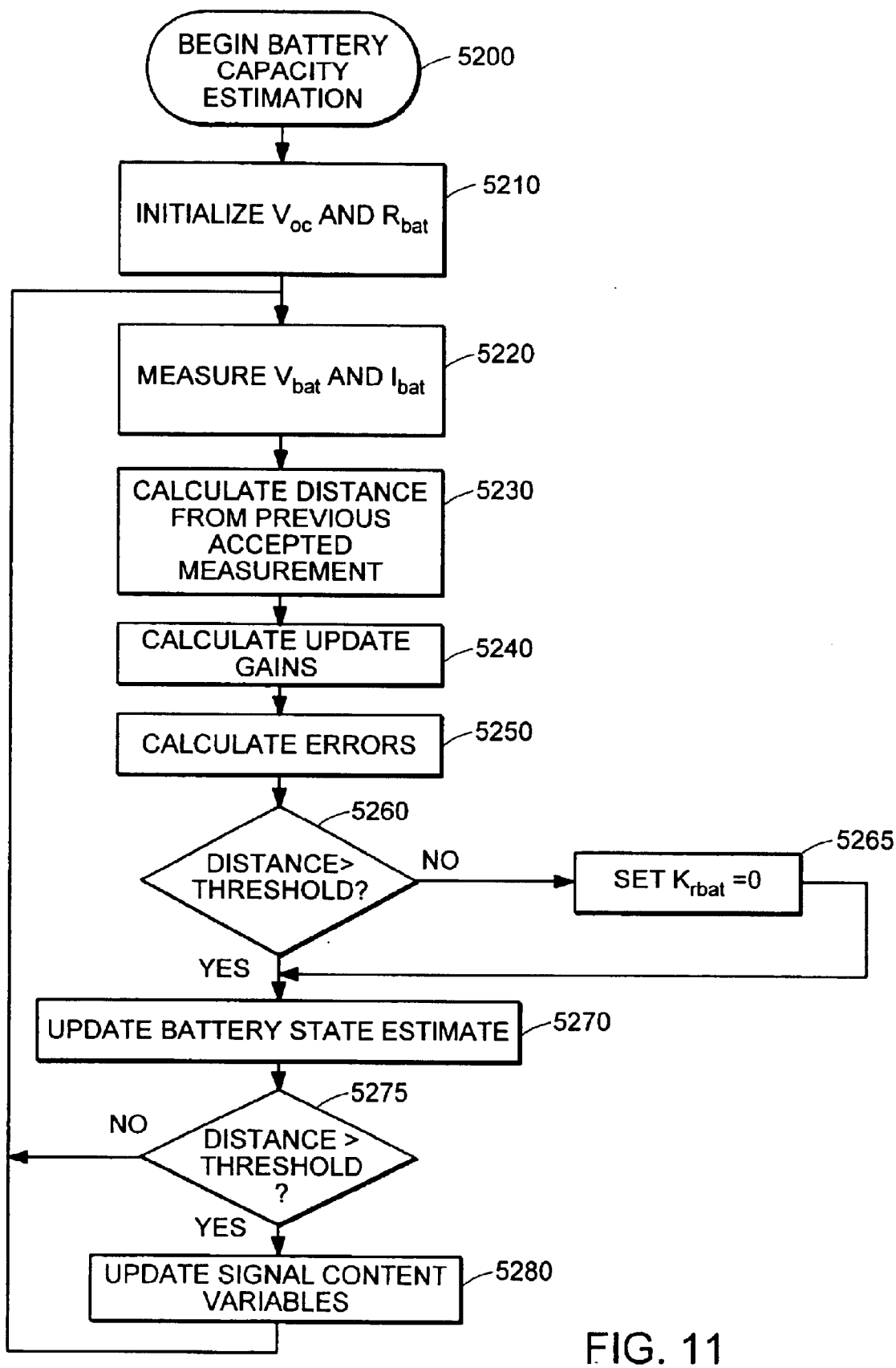
FIG. 11 is a flow diagram illustrating a method for estimating battery parameters.

In another specific embodiment of the invention, as shown in FIG. 11 (step 5200), newly measured values of $V_{bat}$ and $I_{bat}$ are used to correct the estimated values using a low pass filtering algorithm. First the variables are initialized (step 5210), with $V_{oc}$ and $R_{bat}$ set to typical values. Then, $V_{bat}$ and $I_{bat}$ are measured periodically (step 5220). To ensure that the signal is sufficiently "rich", i.e., there is a statistically significant difference between data points, the squared distance, D, of $V_{bat}$ and $I_{bat}$ from the last accepted values of these variables, $V_{prev}$ and $I_{prev}$, is calculated (step 5230):

$$D = (V_{prev} - V_{bat})^2 + (I_{prev} - I_{bat})^2 \quad \text{(Eqn. 6)}.$$

This calculation identifies data points that may provide additional information from which to refine the estimate of current battery parameters. For example, when the transporter is at rest, little current is drawn and a series of such measurements could skew the estimated value for the battery parameters from their true values, as filtering progresses. An appropriately set threshold for D can be used to mitigate the impact of such data points on the estimate.

The following calculations may then be performed:

(1) calculate update gains $K_{voc}$ and $K_{rbat}$ (step 5240):

$$\begin{bmatrix} K_{voc} \\ K_{rbat} \end{bmatrix} = \begin{bmatrix} p_a & p_b \\ p_b & p_c \end{bmatrix} \begin{bmatrix} 1 \\ -I_{bat} \end{bmatrix} = \begin{bmatrix} p_a - p_b * I_{bat} \\ p_b - p_c * I_{bat} \end{bmatrix} \quad \text{(Eqn. 7)}$$

where, $p_a$ is the direct $V_{oc}$ covariance matrix element,
$p_b$ is the cross coupling covariance matrix element, and
$p_c$ is the direct $R_{bat}$ covariance matrix element,
(Note: $p_a$, $p_b$, and $p_c$ represent the uncertainty in the state estimate);

(2) calculate error between battery state estimate and the new data point (step 5250):

$$Err = V_{bat} - (V_{oc} - I_{bat} * R_{bat}) \quad \text{(Eqn. 8)};$$

(3) update battery state estimate (step 5270):
(If D is less than the threshold (step 5265), $K_{rbat}$ may be set to zero (step 5265) so that $R_{bat}$ is not updated.)

$$V_{oc} = V_{oc} + K_{voc} * Err \quad \text{(Eqn. 9)}$$

$$R_{bat} = R_{bat} + K_{rbat} * Err \quad \text{(Eqn. 10); and}$$

(4) update signal content variables (step 5280), if D is greater than the threshold (step 5275):

$$V_{prev} = V_{bat} \quad \text{(Eqn. 11)}$$

$$I_{prev} = I_{bat} \quad \text{(Eqn. 12)}.$$

The process can continue with repeated measurement of $V_{bat}$ and $I_{bat}$ (step 5220).

In a specific embodiment of the invention, $V_{oc}$ is initialized to the first measured value of $V_{bat}$. $R_{bat}$ is set to a value higher than expected in typical operation. This approach to initializing $R_{bat}$ allows the algorithm to bring the $R_{bat}$ estimate down during operation. Matrix element $p_b$ in Eqn. 7 may be set to zero, in this embodiment.

In another embodiment of the invention, estimated values of battery parameters are used to calculate a maximum operating speed for a transporter based on the state of the battery and other transporter parameters, such as motor current. For example, the maximum operating speed of the transporter, Y, may be modeled by a linear equation of the form:

$$Y = M * I_{mot} + B. \quad \text{(Eqn. 13)}$$

The values for M and B may vary over time and either M or B may be functions of current values of transporter operating parameters such as battery open circuit voltage and internal resistance and motor parameters, such as backEMF gain and motor resistance.

In an embodiment of the invention, an estimated maximum operating speed for a transporter is calculated as a linear function of the battery open circuit voltage, the battery internal resistance and a filtered average motor current, where the value of the average motor current is filtered with a low pass filter.

In a specific embodiment of the invention, dual redundant brushless DC motors are provided to drive each wheel of a transporter, which has wheels disposed as in FIG. 1. Dual batteries are provided with each battery powering two motors. The motors may be paired so that the two motors driving a wheel are powered by different batteries, providing redundancy. The transporter maximum operating speed, Y, may be calculated as:

$$Y = -((\sqrt{3}+K_{ell})*(R_{bat}+(R_{ll}+2))*I_{mot})+(V_{OC}+K_{ell}) \quad \text{(Eqn. 14)}$$

where, $K_{ell}$ is the line-to-line backEMF constant of each motor;

$R_{ll}$ is the measured resistance between the two phases of the DC motor;

$I_{mot}$ is an average motor current, where $I_{mot}$ is calculated by summing the filtered currents for the two motors for each wheel and then taking the greater of the absolute values of these sums;

$V_{oc}$ is the estimated open circuit voltage of a battery; and $R_{bat}$ is the estimated internal resistance of a battery.

To ensure that sufficient power is available in either battery to bring the transporter to a controlled stop or maintain balance, the lesser of the estimated values of $V_{oc}$ for the two batteries and the greater of the estimated values of $R_{bat}$ for the two batteries may be employed in Eqn. 14, and transporter speed limited accordingly. As the batteries are discharged, the maximum operating speed for the transporter will decrease.

In a further specific embodiment of the invention, values for $K_{ell}$, the backEMF gain of each motor, and $R_{ll}$, the measured resistance between the two phases of the DC motor, may be estimated by using measured values of transporter operating parameters such as motor temperature. Eqn. 14 may then be periodically modified accordingly.

Selection of Speed Limit

Figure 13A:
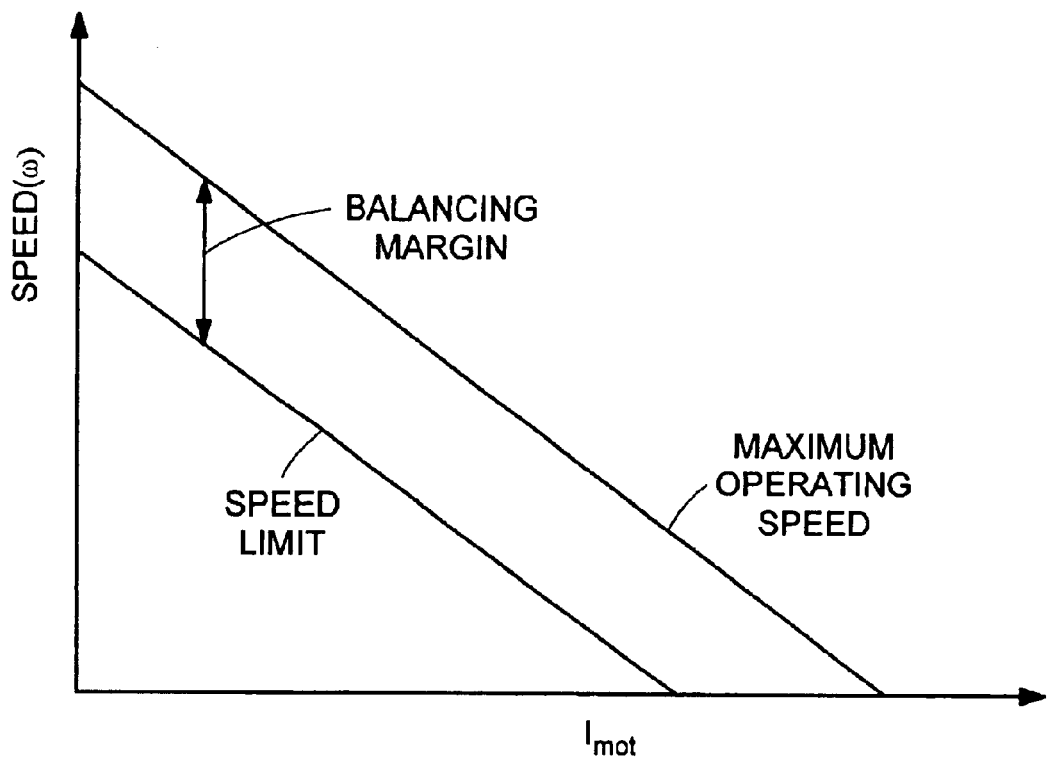
FIGS. 13A–G illustrate setting a speed limit for a transporter.
Figure 13B:
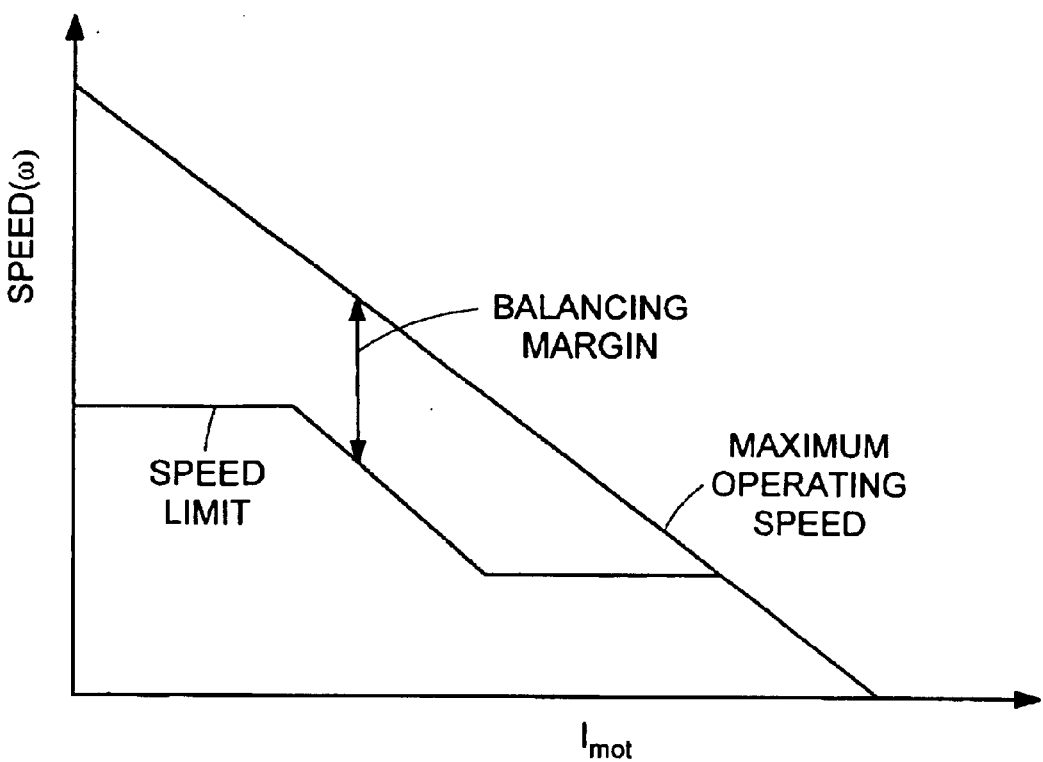

The maximum operating speed can then be used to set an intervention speed and a speed limit for the transporter, ensuring that adequate balancing margin is maintained over varying terrain and operating conditions. The balancing margin can be empirically determined to produce the desired performance characteristics of the transporter. Speed limit can then set by subtracting the balancing margin from the maximum operating speed. Alternatively, for example, the speed limit may be set as a function of the filtered average motor current, $I_{mot}$, for the transporter or as a function of maximum operating speed for a given $I_{mot}$. The speed limit may be a fixed offset from the maximum operating speed for the full range of $I_{mot}$ (as depicted in FIG. 13A) or may vary as $I_{mot}$ varies. Alternatively, the speed limit can be set to an arbitrary value for a specific range of $I_{mot}$ (as depicted in FIG. 13B).

Figure 13E:
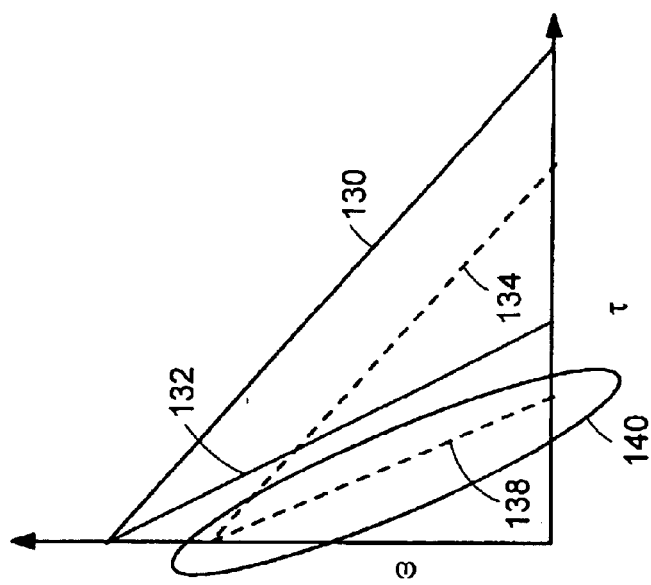

Methods of speed limiting within the scope of the present invention are further discussed with reference to FIGS. 13C–13G. In FIG. 13C, the motor speed ω is plotted vertically, whereas the motor torque τ is plotted horizontally. Motor speed ω is related to the voltage across the motor, to first order, by a constant multiplicative coefficient Ke, also referred to as the 'motor constant,' whereas the motor torque is directly related, to first order, to the motor current. Operating limit 130 depicts the maximum motor speed and torque of which the system is capable under a given set of circumstances that encompass battery conditions, such as battery charge, temperature, and internal impedance, and also conditions external to the battery, such as motor impedance, for example. Various system conditions that might alter the operating limit are influenced by system temperature. Determination of a speed limit in accordance with any of the various system conditions that effect operating limit 130 is encompassed within the scope of the present invention.

In particular, since, in a preferred embodiment of a personal transporter in accordance with the invention, current is delivered, by separate circuits, to each of two stator windings of each motor, thereby advantageously providing redundancy and safety, the torque that may be delivered depends upon whether one or both stator windings are energized. The operating limit 130 depicted in FIG. 13C refers to the case in which both stators are energized. By way of comparison, operating limit 132 depicted, on the same axes, in FIG. 13D, refers to the case in which a single stator is energized, thereby reducing the maximum torque τ of which the motor is capable at a given speed by a factor of two, all other conditions being equal.

Referring, again, to FIG. 13C, in accordance with embodiments of the invention, a torque margin TM may be specified, and operation of the transporter limited to a speed limit 134, so that the torque τ and velocity ω are limited to region 136 within the envelope of speed limit 134. If speed limit 134 is exceeded, torque is applied to the ground-contacting members to reduce tilt, thereby lowering velocity of the transporter, as described in further detail below.

Speed limit 134, as described, is based upon a safety margin or motor torque, and is displaced by a fixed torque margin TM with respect to operational limit 130. A speed limit 138 may also be based on a specified speed margin SM by which it is offset from the operational limit 130 as a vertical displacement in the ω-τ plane, as shown in FIG. 13D.

The locus of the speed limit 134, 138 may be based on considering more than one margin, and, more particularly, may be based upon a speed limit derived on the basis of a minimum taken over a plurality of speed limits, each based on a margin derived on an independent basis. Thus, for example, as shown in FIG. 13E, operational limits 130 and 132 are as described above with reference to FIGS. 13C and 13D, while speed limits 134 and 138 are derived therefrom based on torque and velocity margins respectively. The minimum-velocity limit 140 is thus contiguous, in this case, with the speed-margin-derived speed limit 134, and it is the limit 140 to which operation of the transporter is optimally limited.

Figure 13D:
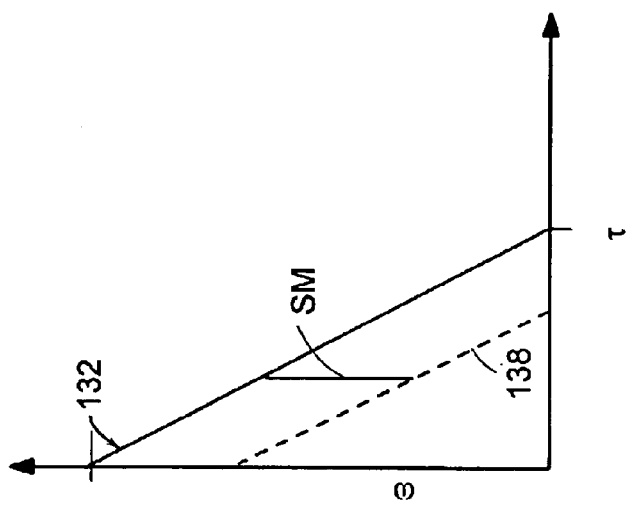
Figure 13C:
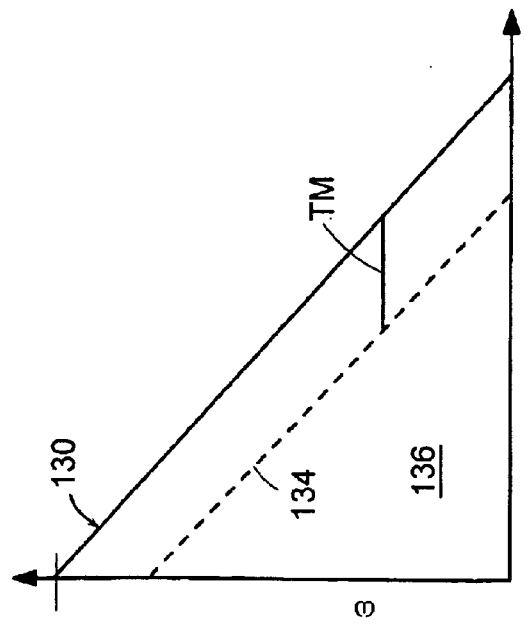

The locus of the speed limiting maximum velocity ω in the ω-τ plane, as depicted by 138 in FIG. 13D may be calculated in accordance with:

$$\omega_{Max} = \frac{-\sqrt{3}}{K_e}(R_{BAT} - R_1/2)I_{SHAFT} + \frac{V_{OC}}{K_e} - SM, \quad \text{(Eqn. 15)}$$

where the variables are as previously defined, SM representing the speed margin, and the velocity limit being based on a single-stator capability, as previously discussed.

The locus of the speed limiting maximum velocity ω in the ω-τ plane, based, this time, on a torque margin, as depicted by 134 in FIG. 13C may be calculated in accordance with:

$$\omega_{Max} = \frac{-\sqrt{3}}{K_e}(R_{BAT} - R_1/2) \cdot \frac{1}{2}(I_{SHAFT} + TM) + \frac{V_{OC}}{K_e}, \quad \text{(Eqn. 16)}$$

where, in this case, the slope is half that of Eqn. 15, reflecting the fact that a dual stator capability is being considered. It is to be understood that other operational assumptions and safety factors may be employed within the scope of the present invention as claimed.

Other operational limits may be applied in defining the speed limit above which the transporter will be returned to a region of constrained operation within the scope of the invention. For example, an absolute upper velocity constraint may be imposed, as indicated by segment 142 of the speed limit of FIG. 13F. Such absolute speed limits may be based on user experience or other considerations. Similarly, a lower speed limit may be imposed, as indicated by segment 144 of the speed limit of FIG. 13F, since, under conditions of hill-climbing or other heavy load, it may be disadvantageous to impose a speed limit below a prescribed minimum.

Figure 13F:
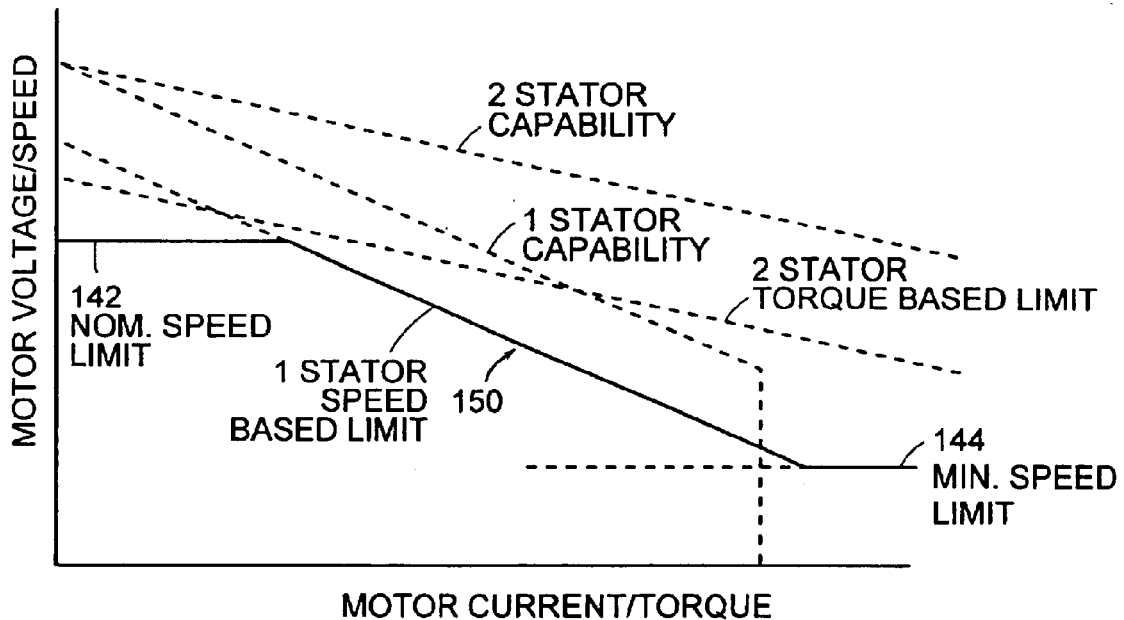
Figure 13G:
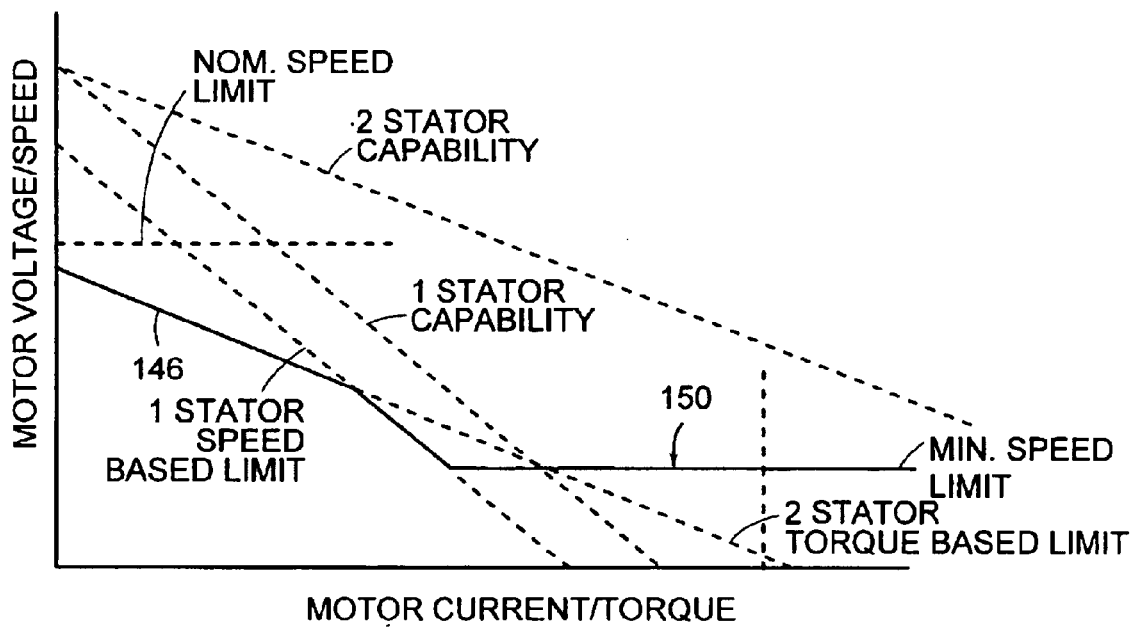

Comparison of FIGS. 13F and 13G illustrate the effect, in accordance with the foregoing teaching with respect to deriving a speed limit based jointly on torque and speed margins, of a dramatic increase in the internal impedance of a battery. In both cases, the solid line 150 indicates the speed limit, or "intervention locus," derived on the basis of the minimum described above. In case of large $R_{BAT}$, for example, the slope of $\omega_{MAX}$ as a function of motor torque may be lower, as in segment 146 of the speed limit 150, than would be derived either by application of a speed margin or of an absolute speed limit 142.

Finally, under certain circumstances, the instantaneous available torque at a given speed, may be less than the specified torque margin TM. If that occurs, it is preferable to shut down the transporter since it may not be possible to restore balanced operation under those conditions.

Balancing Transporter Speed Limiting

In a specific embodiment of the invention, control equation 4 for a balancing transporter may be modified to allow a pitch modification, Δ, to be added to the system pitch value, θ:

$$T=K_1(\theta-(\Delta+\theta_0))+K_2\dot\theta+K_{31}(x+x_0)+K_4\dot x \quad \text{(Eqn. 17)}$$

Figure 12:
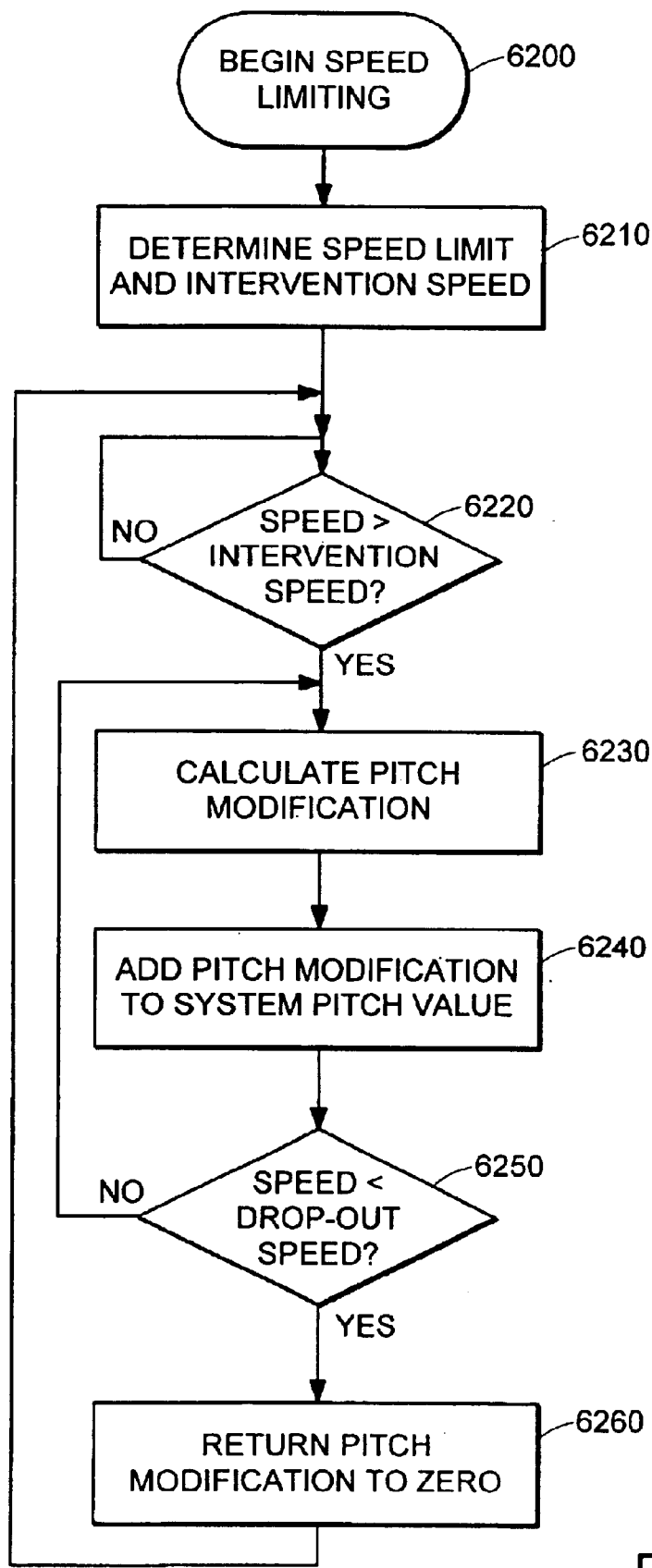
FIG. 12 is a flow diagram illustrating a method for limiting the speed of a balancing transporter.

Adding the pitch modification, A, allows the speed 6200 for a balancing transporter to be limited while still providing system balance in the fore-aft plane. Referring to FIG. 12, first, a speed intervention band is determined 6210. The upper end of the band, the speed limit, may be set by subtracting a balancing margin from the maximum operating speed for the transporter. The intervention speed may be set by subtracting the extent of the speed intervention band from the speed limit. Each of the balancing margin and the extent of the speed intervention band may be constants or may be determined adaptively. In a specific embodiment of the invention, separate speed limits and intervention bands may be defined for motion of the transporter's center of mass in the forward and in the aft directions. The maximum operating speed may be estimated by a variety of methods, including the method described above. Note that the maximum operating speed for the transporter may decrease as the transporter's battery or other fuel source is depleted and the intervention speed and the speed limit may be adjusted accordingly. The relationship among various speed limiting parameters for a typical balancing transporter is illustrated in FIG. 9.

Again referring to FIG. 12, the speed of the transporter is then monitored 6220. When the transporter's speed exceeds the intervention speed, the transporter may be slowed by increasing 6240 the pitch modification, A. Inspection of Eqn. 17 shows that the transporter will respond to the modification by increasing motor torque, causing the system to accelerate. If, for example, the system is moving in the forward direction, the acceleration will cause the system to pitch backwards. The system will respond to this decrease in system pitch value by then reducing motor torque, decelerating the system. ! may be determined 6230 by looking at the difference between the transporter speed and the intervention speed, integrated over time. The pitch modification sequence is repeated 6250 until the transporter slows to a desired dropout speed, which may be the intervention speed, and then the pitch modification may be smoothly returned 6260 to zero. This embodiment may be used advantageously to maintain a speed margin for balancing the transporter in the fore-aft plane and to govern the speed of the transporter.

In a specific embodiment of the invention, the pitch modification may be calculated as follows. When the instantaneous velocity of the transporter's center of mass exceeds the intervention speed, then let:

$$A=(S_{int}-S_{act}); \text{ (proportional term)} \quad \text{(Eqn. 18)}$$

$$B=S'_{act}*A, \text{ if } (S'_{act}>0 \text{ and } A<0), \text{ otherwise } B=0; \text{ (derivative term)} \quad \text{(Eqn. 19)}$$

$$C=C_{prev}+(D*(S_{sl}-S_{act})) \text{ if } C_{prev}<=0,. \text{ otherwise, } C=0 \text{ (integral term)} \quad \text{(Eqn. 20)}$$

And set $\Delta=C+A*G_p+B*G_d,$ (Eqn. 21)

where:

$S_{act}$ is the instantaneous velocity of the transporter's center of mass, $S_{int}$ is the intervention speed;

$S_{sl}$ is the speed limit;

$S'_{act}$ is the acceleration of the transporter;

$C_{prev}$ is the value of C from the previous calculation of the integral term (initialized to zero);

D is a gain term;

$G_p$ is a gain term for the contribution to the desired pitch modification that is proportional to transporter speed.

$G_d$ is a gain term for the contribution to the desired pitch modification that is proportional to transporter acceleration.

Once the pitch modification is calculated, this modification may be introduced to Eqn. 17 smoothly and incrementally. Note that the integral term contribution to the pitch modification is zero until the speed of the transporter exceeds the speed limit. At that point, the term can add substantially to the value of the pitch modification. Thus, the speed limiting effect on the system can become pronounced as the speed limit is exceeded.

Calculation of the pitch modification may be repeated periodically until transporter speed decreases below a dropout value, which may be the intervention speed. When the transporter speed decreases below the drop-out speed, the pitch modification then may be calculated as:

$$\Delta=C_{prev}+(D*(S_{sl}-S_{act})) \text{ if } C<0 \text{ and otherwise } 0; \text{ and} \quad \text{(Eqn. 22).}$$

$$C=\Delta \quad \text{(Eqn. 23).}$$

The pitch modification calculation and changes to the pitch modification may be repeated periodically. The pitch modification may be smoothly and incrementally decreased until the modification returns to zero.

Note that techniques other than adding a pitch modification to the control equation may be used to effect a deceleration of the transporter in a similar manner. For example, an offset value added to the system pitch value, θ, as reported by an inclinometer, will cause the same result. All such techniques are intended to be within the scope of the present invention.

In a further embodiment of the invention, a transporter is provided with means to regenerate batteries supplying power to the drive arrangement. Such regeneration can occur, for example, during hard braking or when the transporter is going downhill. In such a situation, damage may occur if the battery is at full capability and the battery regeneration circuitry forces additional energy into the battery. Such energy is dissipated as heat and the battery voltage may surge. Both effects can cause damage to the battery and drive electronics.

The transporter's speed limit may be modified to prevent an over voltage condition during battery regeneration. The battery voltage is monitored periodically and filtered with a low pass filter. If the filtered battery voltage exceeds an over voltage threshold, the speed limit for the transporter, or equivalently the intervention speed, may be reduced. In a specific embodiment of the invention, an over voltage range is set for the transporter, beginning at the over voltage threshold. The speed limit for the transporter is reduced linearly over this range as a function of battery voltage to a minimum speed characteristic of the transporter. The minimum speed limit may be set equal to the range of the intervention band.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A method for limiting the speed of a transporter having a motorized drive arrangement, the method comprising:
   a. calculating a plurality of maximum speeds based on at least one of a margin of torque and a margin of motor speed specified to provide stable operation under specified sets of operating conditions;
   b. determining a speed limit locus in a plane of motor speed and motor torque such that the speed of the transporter exceeds no maximum speed determined in step (a); and
   c. limiting operation of the motorized drive arrangement to preclude extended operation of the transporter at a speed exceeding the intervention locus.

2. A method in accordance with claim 1, wherein the step of limiting operation includes shutting down the motorized drive arrangement if a specified torque margin may not be maintained.

* * * * *